(12) United States Patent
Masuda et al.

(10) Patent No.: US 11,837,255 B2
(45) Date of Patent: Dec. 5, 2023

(54) DISPLAY METHOD, COMPUTER-READABLE RECORDING MEDIUM RECORDING DISPLAY PROGRAM, AND INFORMATION PROCESSING APPARATUS

(71) Applicant: FUJITSU LIMITED, Kawasaki (JP)

(72) Inventors: Takuya Masuda, Setagaya (JP); Kazuhiro Arima, Minato (JP)

(73) Assignee: FUJITSU LIMITED, Kawasaki (JP)

( * ) Notice: Subject to any disclaimer, the term of this patent is extended or adjusted under 35 U.S.C. 154(b) by 598 days.

(21) Appl. No.: 17/104,410

(22) Filed: Nov. 25, 2020

(65) Prior Publication Data

US 2021/0082473 A1 Mar. 18, 2021

Related U.S. Application Data

(63) Continuation of application No. PCT/JP2018/020404, filed on May 28, 2018.

(51) Int. Cl.
*G11B 27/11* (2006.01)
*A63B 24/00* (2006.01)
(Continued)

(52) U.S. Cl.
CPC .......... *G11B 27/11* (2013.01); *A63B 24/0062* (2013.01); *A63B 71/0622* (2013.01); *A63B 2071/065* (2013.01); *A63B 2071/0675* (2013.01); *A63B 2220/05* (2013.01); *A63B 2220/803* (2013.01); *A63B 2220/806* (2013.01)

(58) Field of Classification Search
None
See application file for complete search history.

(56) References Cited

U.S. PATENT DOCUMENTS

2010/0267462 A1 10/2010 Mooney
2013/0029791 A1* 1/2013 Rose ................ G09B 19/0038
473/409
(Continued)

FOREIGN PATENT DOCUMENTS

JP H03-021274 A 1/1991
JP 2001-000614 A 1/2001
(Continued)

OTHER PUBLICATIONS

Colyer, S.L., Evans, M., Cosker, D.P et al. A Review of the Evolution of Vision-Based Motion Analysis and the Integration of Advanced Computer Vision Methods Towards Developing a Markerless System. Sports Med—Open 4, 24 (2018). https://doi.org/10.1186/s40798-018-0139-y (Year: 2018).*

(Continued)

*Primary Examiner* — Hung Q Dang
(74) *Attorney, Agent, or Firm* — Fujitsu Patent Center

(57) ABSTRACT

A display method includes: acquiring, by a computer, sensing data obtained by sensing a motion of a player by a three-dimension (3D) sensor; specifying predetermined timing of each joint from a change in a degree of bending of each joint of the player based on the sensing data; and displaying the predetermined timing of each joint in a graspable state in association with a slide bar for designating playback timing in a motion model of the player based on the sensing data or a video obtained by capturing the player.

12 Claims, 19 Drawing Sheets

(51) Int. Cl.
  *A63B 71/06* (2006.01)
  *G06T 13/40* (2011.01)
  *G11B 27/34* (2006.01)
  *H04N 5/92* (2006.01)

(56) References Cited

U.S. PATENT DOCUMENTS

| | | | |
|---|---|---|---|
| 2014/0135139 | A1 | 5/2014 | Shibuya et al. |
| 2014/0342844 | A1 | 11/2014 | Mooney |
| 2015/0099252 | A1 | 4/2015 | Anderson et al. |
| 2015/0186713 | A1 | 7/2015 | Cao et al. |
| 2018/0289313 | A1* | 10/2018 | Inan ................ A61B 5/0537 |
| 2019/0066327 | A1 | 2/2019 | Fujimoto et al. |

FOREIGN PATENT DOCUMENTS

| | | |
|---|---|---|
| JP | 2011-502602 A | 1/2011 |
| JP | 2014-97104 A | 5/2014 |
| JP | 2015-130151 A | 7/2015 |
| JP | 2017-038407 A | 2/2017 |
| JP | 2018-19816 A | 2/2018 |
| WO | 2013/041444 A1 | 3/2013 |
| WO | 2017/187641 A1 | 11/2017 |

OTHER PUBLICATIONS

Huang QH, Zheng YP, Chena X, He JF, Shi J. A system for the synchronized recording of sonomyography, electromyography and joint angle. Open Biomed Eng J. Dec. 11, 2007;1:77-84. doi: 10.2174/1874120700701010077. PMID: 19662132; PMCID: PMC2701082. (Year: 2007).*

International Search Report and Written Opinion of the International Searching Authority (Form PCT/ISA/210, 220, and 237), mailed in connection with PCT/JP2018/020404 and dated Aug. 21, 2018 (10 pages).

JPOA—Office Action of Japanese Patent Application No. 2020-521667 dated Oct. 12, 2021 with Machine Translation.

* cited by examiner

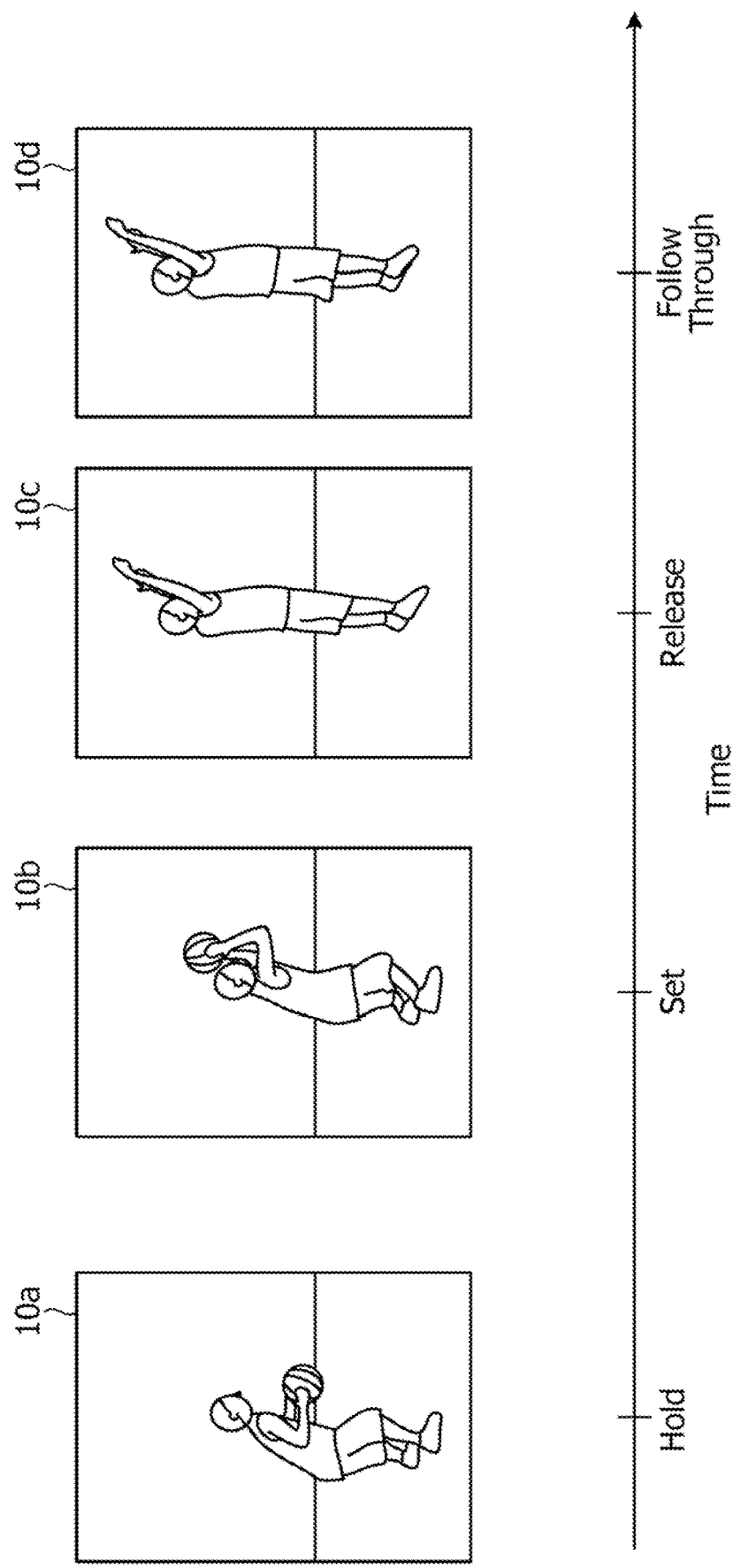

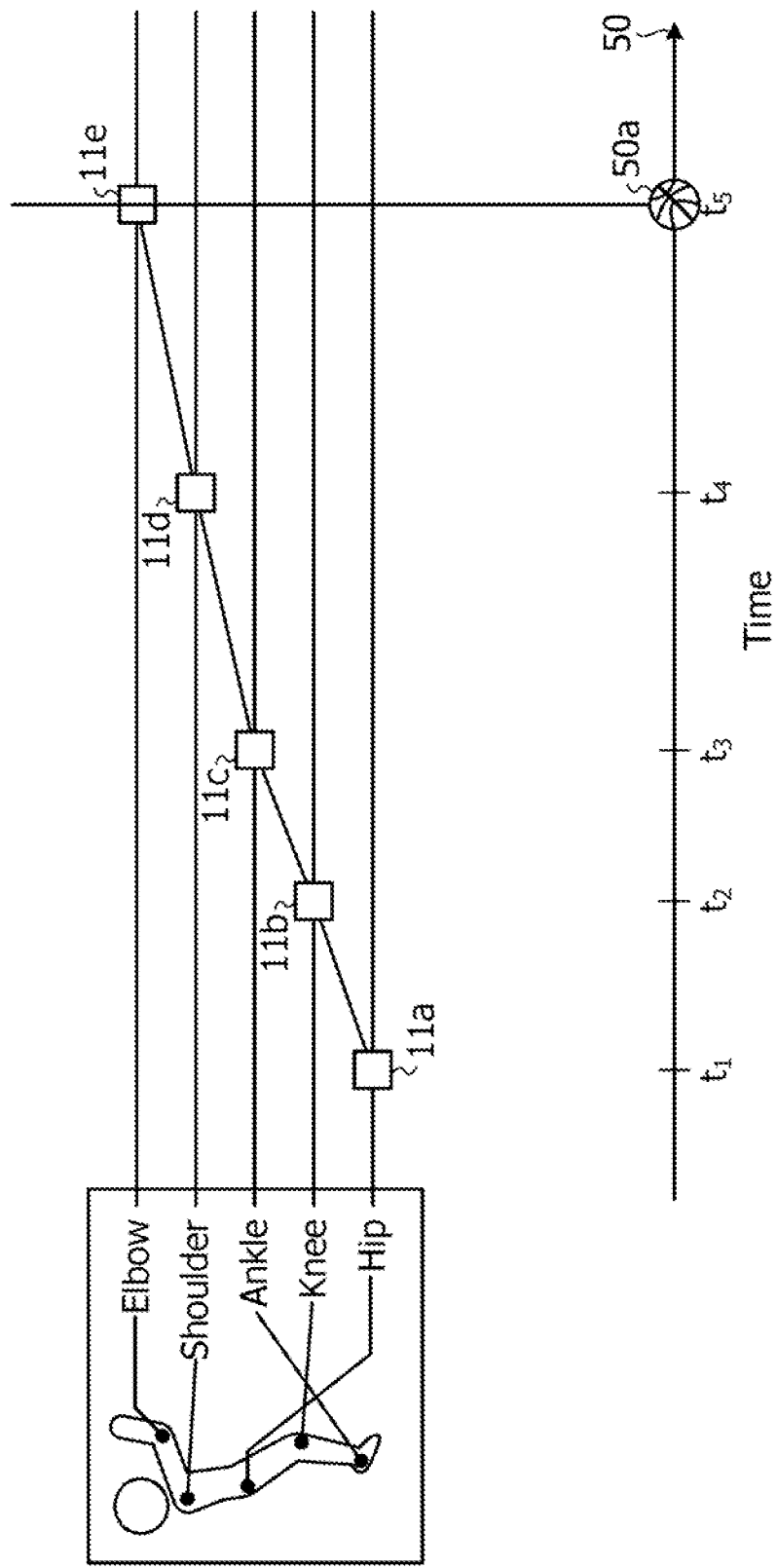

FIG. 5

| PLAYER ID | FRAME NUMBER | SENSING FRAME |
|---|---|---|
| U101 | 1 | SENSING FRAME CORRESPONDING TO PLAYER ID "U101" AND FRAME NUMBER "1" |
| | 2 | SENSING FRAME CORRESPONDING TO PLAYER ID "U101" AND FRAME NUMBER "2" |
| | 3 | SENSING FRAME CORRESPONDING TO PLAYER ID "U101" AND FRAME NUMBER "3" |
| | ... | ... |
| U102 | 1 | SENSING FRAME CORRESPONDING TO PLAYER ID "U102" AND FRAME NUMBER "1" |
| | 2 | SENSING FRAME CORRESPONDING TO PLAYER ID "U102" AND FRAME NUMBER "2" |
| | 3 | SENSING FRAME CORRESPONDING TO PLAYER ID "U102" AND FRAME NUMBER "3" |
| | ... | ... |
| ... | | |

| PLAYER ID | FRAME NUMBER | SENSING FRAME |
|---|---|---|
| U101 | 1 | VIDEO FRAME CORRESPONDING TO PLAYER ID "U101" AND FRAME NUMBER "1" |
| | 2 | VIDEO FRAME CORRESPONDING TO PLAYER ID "U101" AND FRAME NUMBER "2" |
| | 3 | VIDEO FRAME CORRESPONDING TO PLAYER ID "U101" AND FRAME NUMBER "3" |
| | ... | ... |
| U102 | 1 | VIDEO FRAME CORRESPONDING TO PLAYER ID "U102" AND FRAME NUMBER "1" |
| | 2 | VIDEO FRAME CORRESPONDING TO PLAYER ID "U102" AND FRAME NUMBER "2" |
| | 3 | VIDEO FRAME CORRESPONDING TO PLAYER ID "U102" AND FRAME NUMBER "3" |
| | ... | ... |
| ... | | |

| PLAYER ID | FRAME NUMBER | X0 | Y0 | Z0 | ... | X17 | Y17 | Z17 |
|---|---|---|---|---|---|---|---|---|
| U101 | 1 | 100 | 20 | 0 |  | 200 | 40 | 5 |
| U101 | 2 | 101 | 25 | 5 |  | 202 | 39 | 15 |
| U101 | 3 | 110 | 32 | 7 |  | 210 | 45 | 12 |
| ... | ... |  |  |  |  |  |  |  |
| U101 | 100 | 201 | 125 | 30 |  | 225 | 150 | 10 |
| ... | | | | | | | | |
| U102 | 1 | 100 | 21 | 0 | ... | 210 | 45 | 0 |
| ... | | | | | | | | |

FIG. 9

| PLAYER ID | FRAME NUMBER | SKELETON DATA | 3D MODEL DATA |
|---|---|---|---|
| U101 | 1 | SKELETON DATA CORRESPONDING TO PLAYER ID "U101" AND FRAME NUMBER "1" | 3D MODEL DATA CORRESPONDING TO PLAYER ID "U101" AND FRAME NUMBER "1" |
| | 2 | SKELETON DATA CORRESPONDING TO PLAYER ID "U101" AND FRAME NUMBER "2" | 3D MODEL DATA CORRESPONDING TO PLAYER ID "U101" AND FRAME NUMBER "2" |
| | 3 | SKELETON DATA CORRESPONDING TO PLAYER ID "U101" AND FRAME NUMBER "3" | 3D MODEL DATA CORRESPONDING TO PLAYER ID "U101" AND FRAME NUMBER "3" |
| | ... | ... | ... |
| U102 | 1 | SKELETON DATA CORRESPONDING TO PLAYER ID "U102" AND FRAME NUMBER "1" | 3D MODEL DATA CORRESPONDING TO PLAYER ID "U102" AND FRAME NUMBER "1" |
| | 2 | SKELETON DATA CORRESPONDING TO PLAYER ID "U102" AND FRAME NUMBER "2" | 3D MODEL DATA CORRESPONDING TO PLAYER ID "U102" AND FRAME NUMBER "2" |
| | 3 | SKELETON DATA CORRESPONDING TO PLAYER ID "U102" AND FRAME NUMBER "3" | 3D MODEL DATA CORRESPONDING TO PLAYER ID "U102" AND FRAME NUMBER "3" |
| | ... | ... | ... |

| PLAYER ID | FRAME NUMBER | ANGULAR VELOCITY 150f | | | | |
|---|---|---|---|---|---|---|
| | | Hip | Knee | Ankle | Shoulder | Elbow |
| U101 | 1 | $\omega_{h1}$ | $\omega_{k1}$ | $\omega_{a1}$ | $\omega_{s1}$ | $\omega_{e1}$ |
| | 2 | $\omega_{h2}$ | $\omega_{k2}$ | $\omega_{a2}$ | $\omega_{s2}$ | $\omega_{e2}$ |
| | 3 | $\omega_{h3}$ | $\omega_{k3}$ | $\omega_{a3}$ | $\omega_{s3}$ | $\omega_{e3}$ |
| | 4 | $\omega_{h4}$ | $\omega_{k4}$ | $\omega_{a4}$ | $\omega_{s4}$ | $\omega_{e4}$ |
| ... | ... | ... | ... | ... | ... | ... |

FIG. 11

| FRAME NUMBER | COORDINATES | | | | | |
|---|---|---|---|---|---|---|
| | Hip | Knee | Ankle | Shoulder | Elbow | |
| 1 | COORDINATES REGARDING Hip OF FRAME NUMBER "1" | COORDINATES REGARDING Knee OF FRAME NUMBER "1" | COORDINATES REGARDING Ankle OF FRAME NUMBER "1" | COORDINATES REGARDING Shoulder OF FRAME NUMBER "1" | COORDINATES REGARDING Elbow OF FRAME NUMBER "1" | ⋯ |
| 2 | COORDINATES REGARDING Hip OF FRAME NUMBER "2" | COORDINATES REGARDING Knee OF FRAME NUMBER "2" | COORDINATES REGARDING Ankle OF FRAME NUMBER "2" | COORDINATES REGARDING Shoulder OF FRAME NUMBER "2" | COORDINATES REGARDING Elbow OF FRAME NUMBER "2" | |
| 3 | COORDINATES REGARDING Hip OF FRAME NUMBER "3" | COORDINATES REGARDING Knee OF FRAME NUMBER "3" | COORDINATES REGARDING Ankle OF FRAME NUMBER "3" | COORDINATES REGARDING Shoulder OF FRAME NUMBER "3" | COORDINATES REGARDING Elbow OF FRAME NUMBER "3" | |
| 4 | COORDINATES REGARDING Hip OF FRAME NUMBER "4" | COORDINATES REGARDING Knee OF FRAME NUMBER "4" | COORDINATES REGARDING Ankle OF FRAME NUMBER "4" | COORDINATES REGARDING Shoulder OF FRAME NUMBER "4" | COORDINATES REGARDING Elbow OF FRAME NUMBER "4" | |
| ⋮ | ⋮ | ⋮ | ⋮ | ⋮ | ⋮ | |

| FRAME NUMBER | ANGLE | | | | | 155b |
|---|---|---|---|---|---|---|
| | Hip | Knee | Ankle | Shoulder | Elbow | |
| 1 | $\theta_{h1}$ | $\theta_{k1}$ | $\theta_{a1}$ | $\theta_{s1}$ | $\theta_{e1}$ | |
| 2 | $\theta_{h2}$ | $\theta_{k2}$ | $\theta_{a2}$ | $\theta_{s2}$ | $\theta_{e2}$ | |
| 3 | $\theta_{h3}$ | $\theta_{k3}$ | $\theta_{a3}$ | $\theta_{s3}$ | $\theta_{e3}$ | |
| 4 | $\theta_{h4}$ | $\theta_{k4}$ | $\theta_{a4}$ | $\theta_{s4}$ | $\theta_{e4}$ | |
| ... | ... | ... | ... | ... | ... | |

DISPLAY METHOD, COMPUTER-READABLE RECORDING MEDIUM RECORDING DISPLAY PROGRAM, AND INFORMATION PROCESSING APPARATUS

CROSS-REFERENCE TO RELATED APPLICATION

This application is a continuation application of International Application PCT/JP2018/020404 filed on May 28, 2018 and designated the U.S., the entire contents of which are incorporated herein by reference.

FIELD

The embodiments discussed herein are related to a display method and the like.

BACKGROUND

In various sports, the form of a player who performs a series of actions has an important role. Therefore, the player trains to catch up with an ideal form. For example, the player uses a camera to take a video of his/her training state and checks the video to help them improve his/her form.

Japanese Laid-open Patent Publication No. 2017-38407 is disclosed as related art.

SUMMARY

According to an aspect of the embodiments, a display method includes: acquiring, by a computer, sensing data obtained by sensing a motion of a player by a three-dimension (3D) sensor; specifying predetermined timing of each joint from a change in a degree of bending of each joint of the player based on the sensing data; and displaying the predetermined timing of each joint in a graspable state in association with a slide bar for designating playback timing in a motion model of the player based on the sensing data or a video obtained by capturing the player.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A is a diagram for describing Reference Technology 1;

FIG. 2 is a diagram for describing processing of an information processing apparatus according to the present embodiment;

FIG. 5 is a diagram illustrating an example of a data structure of a sensing database (DB) according to the present embodiment;

FIG. 6 is a diagram illustrating an example of a data structure of a video DB according to the present embodiment;

FIG. 8 is a diagram illustrating an example of a data structure of a joint position DB according to the present embodiment;

FIG. 9 is a diagram illustrating an example of a data structure of a three-dimension (3D) model DB according to the present embodiment;

FIG. 10 is a diagram illustrating an example of a data structure of an angular velocity DB according to the present embodiment;

FIG. 11 is a diagram illustrating an example of a data structure of a first intermediate table according to the present embodiment;

FIG. 12 is a diagram illustrating an example of a data structure of a second intermediate table according to the present embodiment;

DESCRIPTION OF EMBODIMENTS

Figure 1B:
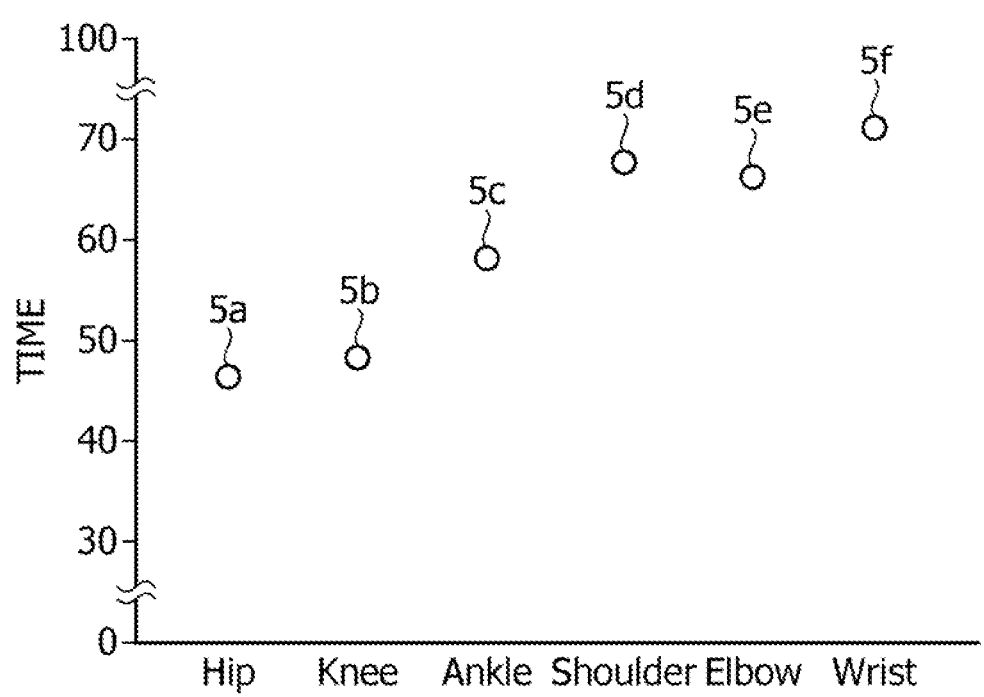
FIG. 1B is a diagram for describing Reference Technology 2.

The related art discloses a technique for enabling easy comparison of a plurality of videos. In this related art, for example, checkpoints such as an address, a top, an impact, or a finish is set in each video relating to a golf swing, and a playback speed of each video is adjusted such that playback timing of a checkpoint matches in a video to be compared.

However, the above-described related art has a problem of being not able to assist grasping a motion and a state of the body on the basis of motions of joints of the player who performs training.

In one aspect, a display method, a display program, and an information processing apparatus capable of assisting grasping a motion and a state of a body on the basis of motions of joints of a player who performs training may be provided.

Hereinafter, embodiments of a display method, a display program, and an information processing apparatus will be described in detail with reference to the drawings. Note that the present embodiments are not limited to the examples.

EMBODIMENTS

Prior to describing the present embodiment, Reference Technology 1 and Reference Technology 2 will be described. Reference technologies 1 and 2 are not related art. FIG. 1A is a diagram for describing Reference Technology 1. As an example, description will be given using video data in which a player practices basketball shot.

For example, in Reference Technology 1, video data obtained by capturing a series of actions of a player is analyzed, an image frame corresponding to a predetermined checkpoint is specified from the video data, and the image frames are displayed in time series. In the example illustrated in FIG. 1A, Reference Technology 1 sequentially displays image frames 10a, 10b, 10c, and 10d. Note that, in the example in FIG. 1A, "Hold", "Set", "Release", and "Follow Through" are set as the checkpoints in the video data of the basketball shot.

The image frame 10a is an image frame when the player takes a "Hold" posture. The image frame 10b is an image frame when the player takes a "Set" posture. The image frame 10c is an image frame when the player takes a "Release" posture. The image frame 10d is an image frame when the player takes a "Follow Through" posture.

The player can confirm the image of his/her posture at each checkpoint by referring to the information illustrated in FIG. 1A. However, in such a reference technology, it is only possible to confirm the image of the posture of the player, and it is difficult to grasp a motion and a state of the body on the basis of motions of joints of the player who performs training.

FIG. 1B is a diagram for describing Reference Technology 2. In Reference Technology 2, angular velocities of the joints of the player when the player has performed a certain action are calculated, and information for plotting a time at which the angular velocity becomes maximum for each joint is displayed. The vertical axis in FIG. 1B represents an axis indicating time, and the horizontal axis corresponds to each joint. For example, the time at which the player's "Hip" angular velocity becomes maximum is illustrated by a marker 5a. The time at which the player's "Knee" angular velocity becomes maximum is illustrated by a marker 5b. The time at which the player's "Ankle" angular velocity becomes maximum is illustrated by a marker Sc. The time at which the player's "Shoulder" angular velocity becomes maximum is illustrated by a marker 5d. The time at which the player's "Elbow" angular velocity becomes maximum is illustrated by a marker 5e. The time at which the player's "Wrist" angular velocity becomes maximum is illustrated by a marker 5f.

For example, in Reference Technology 2, the time at which the angular velocity becomes maximum can be grasped for each joint. However, correspondence between the video data of the player captured using a camera or the sensing data of the player and each time is not managed on the system. Therefore, the posture of the player at a certain time (for example, the time at which the Hip angular velocity has become maximum) is not able to be confirmed from the video data or the sensing data.

Next, an example of processing of the information processing apparatus according to the present embodiment will be described. The information processing apparatus according to the present embodiment senses the player who performs a series of actions, using a three-dimension (3D) laser sensor, acquires sensing data, and specifies the motion of each joint of the player, using the sensing data. The information processing apparatus calculates the angular velocity of each joint from the motion of the each joint, specifies timing at which the angular velocity becomes maximum for the each joint, and displays the timing in association with a slide bar for designating timing.

FIG. 2 is a diagram for describing processing of the information processing apparatus according to the present embodiment. In the present embodiment, as an example, timings at which the player's "Hip", "Knee", "Ankle", "Shoulder", and "Elbow" angular velocities become maximum are specified and displayed in association with a slide bar 50. For example, the "Hip" angular velocity is an angular velocity regarding an angle of a hip joint of the player. The "Knee" angular velocity is an angular velocity regarding to a bending angle of a knee of the player. The "Ankle" angular velocity is an angular velocity regarding a bending angle of an ankle of the player. The "Shoulder" angular velocity is an angular velocity regarding an angle around a shoulder. The "Elbow" angular velocity is an angular velocity regarding a bending angle of an elbow of the player.

In the example illustrated in FIG. 2, at time $t_1$, the "Hip" angular velocity becomes maximum. At time $t_2$, the "Knee" angular velocity becomes maximum. At time $t_3$, the "Ankle" angular velocity becomes maximum. At time $t_4$, the "Shoulder" angular velocity becomes maximum. At time $t_5$, the "Elbow" angular velocity becomes maximum.

The information processing apparatus moves a slide 50a of the slide bar 50 in time series and displays a marker 11a when the slide 50a has reached the time $t_1$. The information processing apparatus displays a marker 11b when the slide 50a has reached the time $t_2$. The information processing apparatus displays a marker 11c when the slide 50a has reached the time $t_3$. The information processing apparatus displays a marker 11d when the slide 50a has reached the time $t_1$. The information processing apparatus displays a marker 11e when the slide 50a has reached the time $t_5$. Note that the player may operate an input device to move the slide 50a of the slide bar 50.

Here, the motions of the joints of the player who is good at shooting are linked, and the hip joint, the knee joint, the ankle, the shoulder, and the elbow are stretched in this order in the series of motions. For example, in the case where the order of the joints having maximum angular velocity is "Hip", "Knee", "Ankle", "Shoulder", and "Elbow", the form can be said to be an ideal form.

When the user (player) refers to the information illustrated in FIG. 2, the user can confirm the order of the joints having maximum angular velocity in accordance with the motion of the slide 50a, and can confirm whether the motions of the joints can be well linked (whether force is well transmitted). Therefore, the information processing apparatus according to the present embodiment can assist grasping the motion and the state of the body of the player who performs training, thereby improving the problems described in Reference Technologies 1, 2, and the like.

For example, the present embodiment technically improves the system that displays the transition of the motions of the joints of the player using a graph, as illustrated in FIG. 1B, using the GUI illustrated in FIG. 2. This is because in the present embodiment, the correspondence between the video data or the sensing data, and characteristic points in the motions of the joints is managed, whereby, when the user specifies a characteristic point in a motion of a joint, the video data or the sensing data at the corresponding timing can be displayed. The GUI according to the present embodiment can improve the degree of user's grasp of the motion and posture, and technically improve operability of the user.

Figure 3:
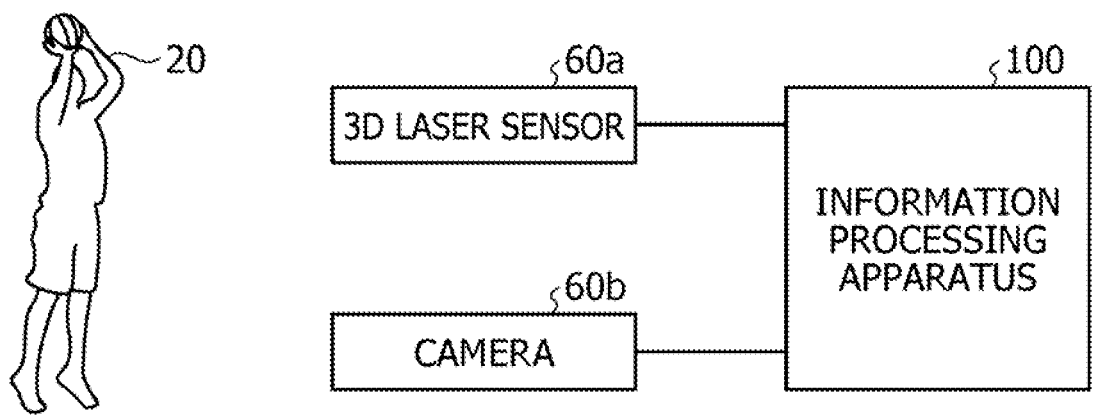
FIG. 3 is a diagram for describing a configuration of a system according to the present embodiment.

Next, an example of a configuration of a system according to the present embodiment will be described. FIG. 3 is a diagram for describing the configuration of the system according to the present embodiment. As illustrated in FIG. 3, the system includes a 3D laser sensor 60a, a camera 60, and an information processing apparatus 100. The information processing apparatus 100 is connected to the 3D laser sensor 60a and a camera 60b.

The 3D laser sensor 60a is a sensor that performs 3D sensing for a player 20. The 3D laser sensor 60a outputs sensing data that is a sensing result to the information processing apparatus 100. Note that the 3D laser sensor 60a is an example of a sensor capable of measuring a distance to the player 20. The sensing data includes a plurality of sensing frames, and frame numbers are assigned in ascending order.

The camera 60b is a device that captures video data of the player 20. The camera 60b outputs the video data to the information processing apparatus 100. The video data includes a plurality of video frames corresponding to an image of the player 20, and a frame number is assigned to each video frame in ascending order. It is assumed that the frame number of the video data and the frame number of the sensing data are synchronized.

The information processing apparatus 100 senses the player 20 who performs a series of actions, using the 3D laser sensor 60a, acquires the sensing data, and specifies the motion of each joint of the player, using the sensing data. The information processing apparatus 100 calculates an angular velocity of each joint from a motion of the each joint, specifies timing when the angular velocity becomes maximum for the each joint, and displays the timing in association with a slide bar for designating timing.

Figure 4:
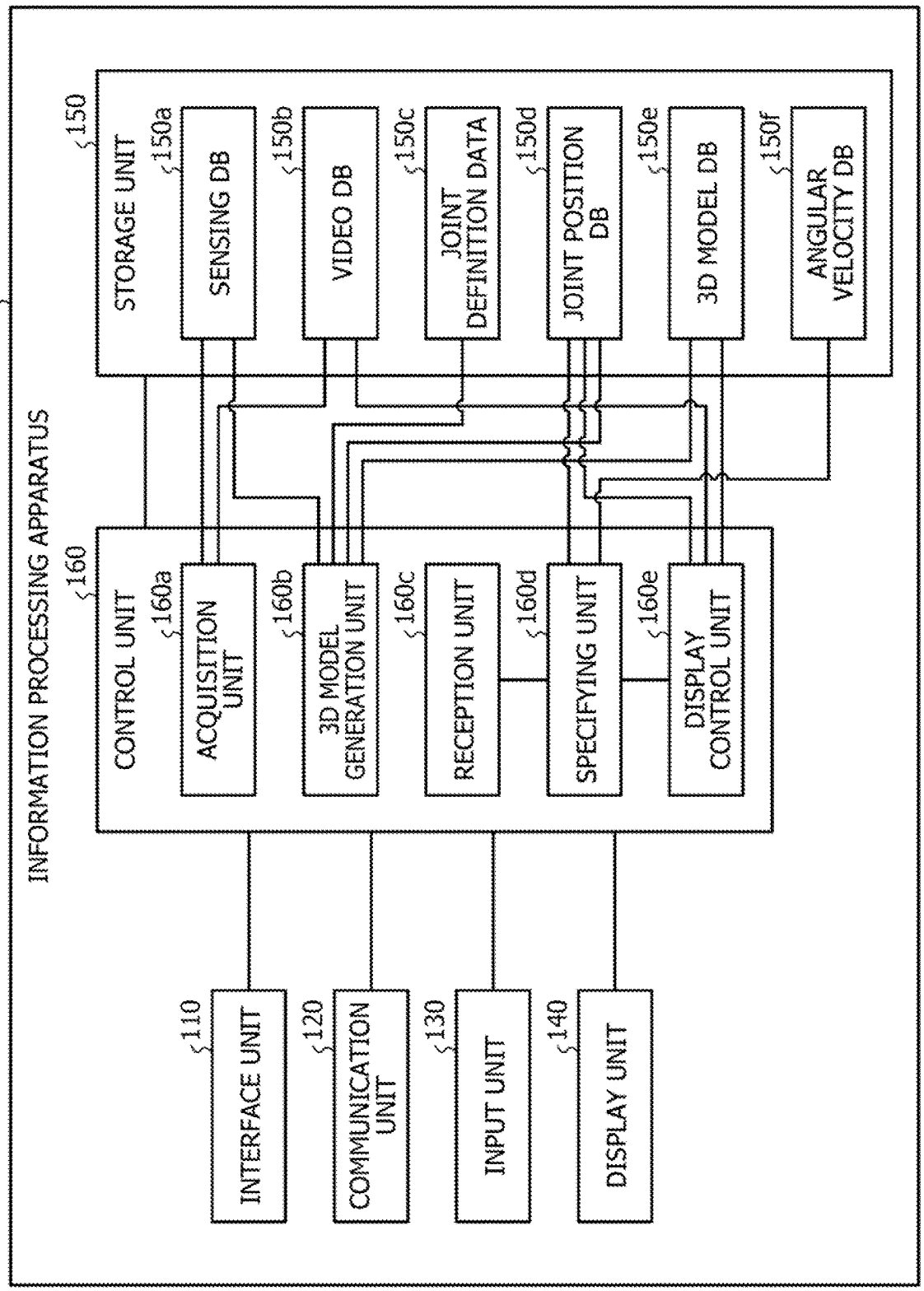
FIG. 4 is a functional block diagram illustrating a configuration of the information processing apparatus according to the present embodiment.

FIG. 4 is a functional block diagram illustrating a configuration of the information processing apparatus according to the present embodiment. As illustrated in FIG. 4, the information processing apparatus 100 includes an interface unit 110, a communication unit 120, an input unit 130, a display unit 140, a storage unit 150, and a control unit 160.

The interface unit 110 is a device that is connected to the 3D laser sensor 60a and the camera 60b and acquires data from the 3D laser sensor 60a and the camera 60b. The interface unit 110 outputs the acquired data to the control unit 160. For example, the interface unit 110 acquires the sensing data from the 3D laser sensor 60a. The interface unit 110 acquires the video data from the camera 60b.

The communication unit 120 is a device that performs data communication with other devices via a network. The communication unit 120 corresponds to a communication device. The information processing apparatus 100 may be connected to the 3D laser sensor 60a and the camera 60b via a network. In this case, the communication unit 120 acquires the data from the 3D laser sensor 60a and the camera 60b via the network.

The input unit 130 is an input device for inputting various types of information to the information processing apparatus 100. The input unit 130 corresponds to a keyboard, a mouse, a touch panel, or the like. For example, the user may operate the input unit 130 to move the slide 50a of the slide bar 50.

The display unit 140 is a display device that displays information of a display screen output from the control unit 160. For example, the display unit 140 displays the information described with reference to FIG. 2, and the like. The display unit 140 corresponds to a liquid crystal display, a touch panel, or the like.

The storage unit 150 includes a sensing DB 150a, a video DB 150b, joint definition data 150c, a joint position database (DB) 150d, a 3D model DB 150e, and an angular velocity DB 150f. The storage unit 150 corresponds to a semiconductor memory element such as a random access memory (RAM), a read only memory (ROM), and a flash memory, or a storage device such as a hard disk drive (HDD).

The sensing DB 150a is a database that stores the sensing data acquired from the 3D laser sensor 60a. FIG. 5 is a diagram illustrating an example of a data structure of the sensing DB according to the present embodiment. As illustrated in FIG. 5, the sensing DB 150a associates a player ID, a frame number, and a sensing frame one another. The player ID is information for uniquely identifying the player. The frame number is a number for uniquely identifying each sensing frame corresponding to the same player ID. The sensing frame is a sensing frame sensed by the 3D laser sensor 60a. For example, each sensing frame includes distance information between each point on an object (player) included in a capture range of the 3D laser sensor 60a and the 3D laser sensor 60a.

The video DB 150b is a database that stores the video data acquired from the camera 60. FIG. 6 is a diagram illustrating an example of a data structure of the video DB according to the present embodiment. As illustrated in FIG. 6, the player ID, the frame number, and the video frame are associated. The player ID is information for uniquely identifying the player. The frame number is a number for uniquely identifying each video frame corresponding to the same player ID. The video frame is a video frame captured by the camera 60b.

Figure 7:
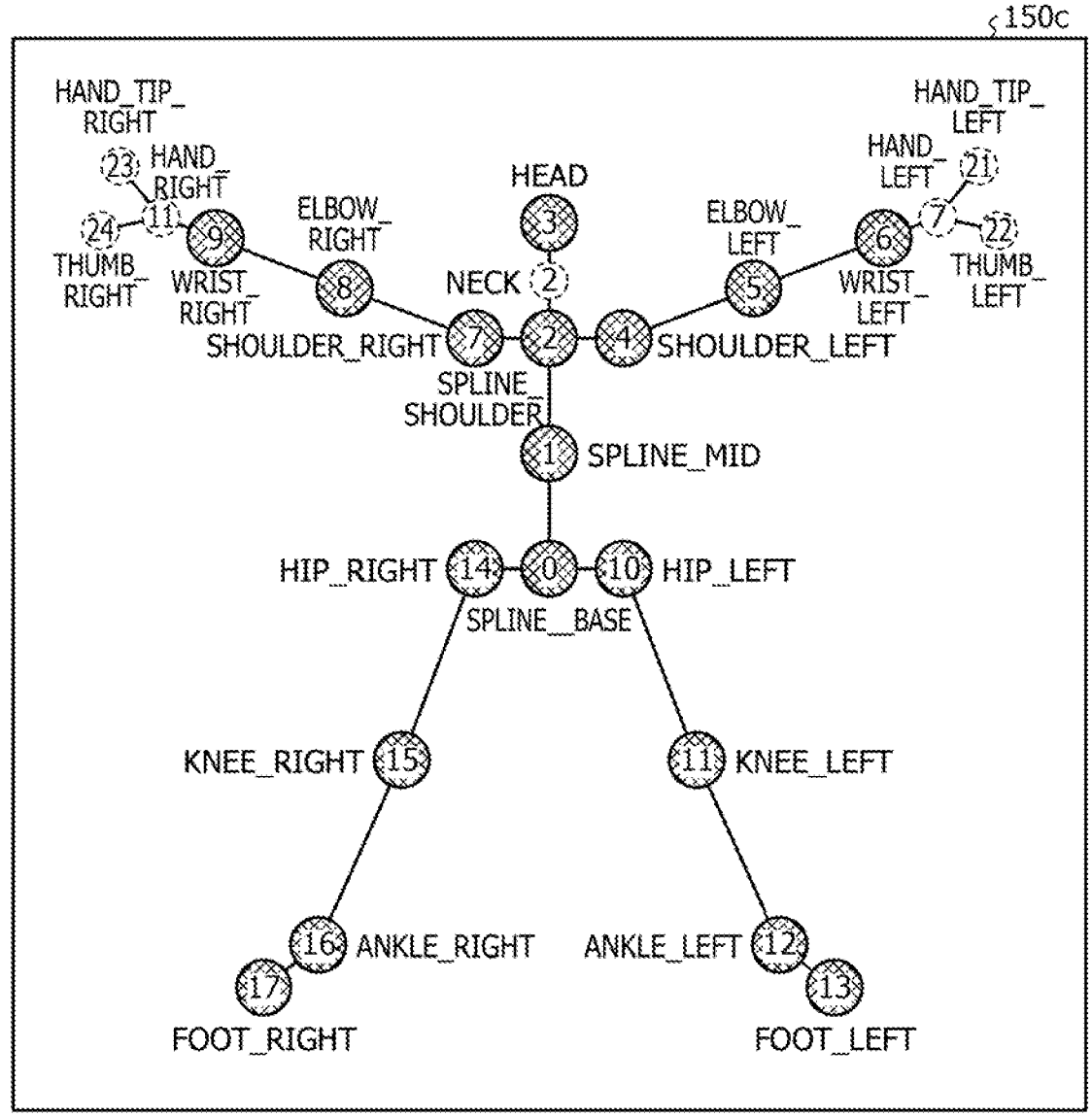
FIG. 7 is a diagram illustrating an example of joint definition data according to the present embodiment.

The joint definition data 150c defines each joint position of the player. FIG. 7 is a diagram illustrating an example of the joint definition data according to the present embodiment. As illustrated in FIG. 7, the joint definition data 150c stores information in which each joint specified by a known skeleton model is numbered. For example, as illustrated in FIG. 7, a right shoulder joint (SHOULDER_RIGHT) is assigned with number 7, a left elbow joint (ELBOW_LEFT) is assigned with number 5, a left knee joint (KNEE_LEFT) is assigned with number 11, and a right hip joint (HIP_RIGHT) is assigned with number 14. For example, an X coordinate may be described as X8, a Y coordinate as Y8, and a Z coordinate as Z8, of the right shoulder joint of number 8.

The joint position DB 150d is position data of each joint of the player 20 generated on the basis of the sensing data of the 3D laser sensor 60a. FIG. 8 is a diagram illustrating an example of a data structure of the joint position DB according to the present embodiment. As illustrated in FIG. 8, the joint position DB 150d associates the player ID, the frame number, and "X0, Y0, Z0, . . . , X17, Y17, and Z17". The player ID is information for uniquely identifying the player.

In FIG. 8, the frame number is a number for uniquely identifying each sensing frame corresponding to the same player ID. It is assumed that the frame number corresponding to a player ID "U101" in FIG. 8 and the frame number corresponding to a player ID "U101" in FIG. 5 are synchronized. "X0, Y0, Z0, . . . , X17, Y17, and Z17" are XYZ coordinates of the joints, and for example, "X0, Y0, Z0" are three-dimensional coordinates of the joint number 0 illustrated in FIG. 7.

The 3D model DB 150e is a database that stores 3D model information of the player 20 generated on the basis of the sensing data. FIG. 9 is a diagram illustrating an example of a data structure of the 3D model DB according to the present embodiment. As illustrated in FIG. 9, the 3D model DB 150e associates the player ID, the frame number, skeleton data, and 3D model data. Description about the player ID and the frame number is the same as the description given in the sensing DB 150a.

The skeleton data is data indicating a skeleton of the player 20 estimated by connecting the joint positions. The 3D model data is 3D model data of the player 20 estimated on the basis of the information obtained from the sensing data and the skeleton data.

The angular velocity DB 150f is a database that stores information regarding the angular velocity of each joint. FIG. 10 is a diagram illustrating an example of a data structure of the angular velocity DB according to the present embodiment. As illustrated in FIG. 10, the angular velocity DB 150f associates the player ID, the frame number, and the angular velocity of each joint. The player ID is information for uniquely identifying the player. The frame number is a number for uniquely identifying a sensing frame. For example, as the angular velocities of the joints, the "Hip", "Knee", "Ankle", "Shoulder", and "Elbow" angular velocities are included.

The "Hip" angular velocity is an angular velocity regarding an angle of the hip joint of the player. For example, it is assumed that the angle of the player's hip joint is defined as an angle formed by a "Hip" line segment and a preset "Hip" reference line. The "Hip" line segment is a line segment passing through coordinates (X10, Y10, Z10) and the coordinates (X14, Y14, Z14) in FIG. 7.

The "Knee" angular velocity is an angular velocity regarding to a bending angle of a knee of the player. For example, it is assumed that the bending angle of the player's knee is defined as an angle formed by a first "Knee" line segment and a second "Knee" line segment. The first "Knee" line segment is a line segment passing through coordinates (X14, Y14, Z14) and coordinates (X15, Y15, Z15) in FIG. 7. The second "Knee" line segment is a line segment passing through coordinates (X15, Y15, Z15) and coordinates (X16, Y16, Z16) in FIG. 7.

The "Ankle" angular velocity is an angular velocity regarding a bending angle of an ankle of the player. For example, it is assumed that the bending angle of the player's ankle is an angle formed by an "Ankle" line segment and a preset "Ankle" reference line. The "Ankle" line segment is a line segment passing through coordinates (X16, Y16, Z16) and coordinates (X17, Y17, Z17) in FIG. 7.

The "Shoulder" angular velocity is an angular velocity regarding an angle around a shoulder. For example, it is assumed that the angle around the player's shoulder is defined as an angle formed by a "Shoulder" line segment and a preset "Shoulder" reference line. The "Shoulder" line segment is a line segment passing through coordinates (X4, Y4, Z4) and coordinates (X7, Y7, Z7) in FIG. 7.

The "Elbow" angular velocity is an angular velocity regarding a bending angle of an elbow of the player. For example, it is assumed that the bending angle of the player's elbow is defined as an angle formed by a first "Elbow" line segment and a second "Elbow" line segment. The first "Elbow" line segment is a line segment passing through coordinates (X7, Y7, Z7) and coordinates (X8, Y8, Z8) in FIG. 7. The second "Elbow" line segment is a line segment passing through coordinates (X8, Y8, Z8) and coordinates (X9, Y9, Z9) in FIG. 7.

The description returns to FIG. 4. The control unit 160 includes an acquisition unit 160a, a 3D model generation unit 160b, a reception unit 160c, a specifying unit 160d, and a display control unit 160e. The control unit 160 can be implemented by a central processing unit (CPU), a micro processing unit (MPU), or the like. Furthermore, the control unit 160 may also be implemented by a hard wired logic such as an application specific integrated circuit (ASIC) or a field programmable gate array (FPGA).

The acquisition unit 160a acquires the sensing data from the 3D laser sensor 60a and stores the acquired sensing data in the sensing DB 150a. The acquisition unit 160a associates the player ID, the frame number, and the sensing frame when storing the sensing data in the sensing DB 150a. The player ID may be set in the sensing data, or the player 20 may operate the input unit 130 to designate the player ID for the sensing data.

The acquisition unit 160a acquires the video data from the camera 60b and stores the acquired video data in the video DB 150b. The acquisition unit 160a associates the player ID, the frame number, and the video frame. The player ID may be set in the video data, or the player 20 may operate the input unit 130 to designate the player ID for the video data.

The 3D model generation unit 160b is a processing unit that generates 3D model data corresponding to each frame number of each player ID on the basis of the sensing DB 150a. Hereinafter, an example of the processing performed by the 3D model generation unit 160b will be described. The 3D model generation unit 160b compares the sensing frame of the sensing DB 150a with a positional relationship of each joint defined in the joint definition data 150c, and identifies a type of each joint and the three-dimensional coordinates of the joint included in the sensing frame. The 3D model generation unit 160b repeatedly executes the above processing for each frame number of each player ID to generate the joint position DB 150d.

The 3D model generation unit 160b generates skeleton data by connecting the three-dimensional coordinates of the joints stored in the joint position DB 150d on the basis of a connection relationship defined in the joint definition data 150c. Furthermore, the 3D model generation unit 160b applies the estimated skeleton data to a skeleton model that matches a physique of the player 20 to generate 3D model data. The 3D model generation unit 160b repeatedly executes the above processing for each frame number of each player ID to generate the 3D model DB 150e.

The reception unit 160c is a processing unit that receives designation of the player ID. The reception unit 160c outputs the received player ID to the specifying unit 160d. For example, the player 20 performs a series of actions and is sensed by the 3D laser sensor 60a, and then operates the input unit 130 to input the player's own player ID in order to confirm his/her own form.

The specifying unit 160d is a processing unit that generates the angular velocity DB 150f corresponding to the player ID. Hereinafter, an example of processing performed by the specifying unit 160d will be described. When having acquired the player ID, the specifying unit 160d extracts coordinate information to be used for calculating the angle of each joint from among coordinate information of the joints corresponding to the player ID, and stores the extracted coordinate information in a first intermediate table.

FIG. 11 is a diagram illustrating an example of a data structure of the first intermediate table according to the present embodiment. As illustrated in FIG. 11, in a first intermediate table 155a, a frame number and coordinates are associated. The frame number is a number for uniquely identifying a sensing frame. The coordinates are the coordinate information used for calculating the angle of each joint, and includes the coordinate information regarding "Hip", "Knee", "Ankle", "Shoulder", and "Elbow".

The "Hip" coordinates are coordinates used to calculate the "Hip" line segment among the coordinates (X0, Y0, Z0 to X17, Y17, Z17 in FIG. 8) corresponding to the set of the player ID and the frame number. The coordinates used to calculate the "Hip" line segment are coordinates (X10, Y10, Z10) and coordinates (X14, Y14, Z14).

The "Knee" coordinates are coordinates used to calculate the first "Knee" line segment and the second "Knee" line segment among the coordinates (X0, Y0, Z0 to X17, Y17, Z17 in FIG. 8) corresponding to the set of the player ID and the frame number. The coordinates used to calculate the first "Knee" line segment are coordinates (X14, Y14, Z14) and coordinates (X15, Y15, Z15). The coordinates used to calculate the second "Knee" line segment are coordinates (X15, Y15, Z15) and coordinates (X16, Y16, Z16).

The "Ankle" coordinates are coordinates used to calculate the "Ankle" line segment among the coordinates (X0, Y0, Z0 to X17, Y17, Z17 in FIG. 8) corresponding to the set of the player ID and the frame number. The coordinates used to calculate the "Ankle" line segment are coordinates (X16, Y16, Z16) and coordinates (X17, Y17, Z17).

The "Shoulder" coordinates are coordinates used to calculate the "Shoulder" line segment among the coordinates (X0, Y0, Z0 to X17, Y17, Z17 in FIG. 8) corresponding to the set of the player ID and the frame number. The coordinates used to calculate the "Shoulder" line segment are coordinates (X4, Y4, Z4) and coordinates (X7, Y7, Z7).

The "Elbow" coordinates are coordinates used to calculate the first "Elbow" line segment and the second "Elbow" line segment among the coordinates (X0, Y0, Z0 to X17, Y17, Z17 in FIG. 8) corresponding to the set of the player ID and the frame number. The coordinates used to calculate the first "Elbow" line segment are coordinates (X7, Y7, Z7) and coordinates (X8, Y8, Z8). The coordinates used to calculate the second "Elbow" line segment are coordinates (X8, Y8, Z8) and coordinates (X9, Y9, Z9).

The specifying unit 160d extracts the coordinate information of "Hip", "Knee", "Ankle", "Shoulder", and "Elbow" for each frame number from the joint position DB 150d to generate the first intermediate table 155a. The specifying unit 160d generates a second intermediate table 155b on the basis of the first intermediate table 155a.

FIG. 12 is a diagram illustrating an example of a data structure of the second intermediate table according to the present embodiment. As illustrated in FIG. 12, in the second intermediate table 155b, a frame number and an angle are associated. The frame number is information for uniquely identifying a sensing frame. The angle indicates the angle of each joint, and includes the angles regarding "Hip", "Knee", "Ankle", "Shoulder", and "Elbow".

The "Hip" angle is an angle formed by the "Hip" line segment and the preset "Hip" reference line. The specifying unit 160d calculates a "Hip" angle $\theta_{hn}$ of a frame number n on the basis of the "Hip" coordinates of the frame number n of the first intermediate table 155a.

The "Knee" angle is an angle formed by the first "Knee" line segment and the second "Knee" line segment. The specifying unit 160d calculates a "Knee" angle $\theta_{kn}$ of the frame number n on the basis of the "Knee" coordinates of the frame number n of the first intermediate table 155a.

The "Ankle" angle is an angle formed by the "Ankle" line segment and the preset "Ankle" reference line. The specifying unit 160d calculates an "Ankle" angle $\theta_{an}$ of the frame number n on the basis of the "Ankle" coordinates of the frame number n of the first intermediate table 155a.

The "Shoulder" angle is an angle formed by the "Shoulder" line segment and the preset "Shoulder" reference line. The specifying unit 160d calculates a "Shoulder" angle $\theta_{sn}$ of the frame number n on the basis of the "Shoulder" coordinates of the frame number n of the first intermediate table 155a.

The "Elbow" angle is an angle formed by the first "Elbow" line segment and the second "Elbow" line segment. The specifying unit 160d calculates an "Elbow" angle $\theta_{en}$ of the frame number n on the basis of the "Elbow" coordinates of the frame number n of the first intermediate table 155a.

The specifying unit 160d calculates the angles of "Hip", "Knee", "Ankle", "Shoulder", and "Elbow" for each frame number to generate the second intermediate table 155b. The specifying unit 160d generates the angular velocity DB 150f on the basis of the second intermediate table 155b.

An example of processing in which the specifying unit 160d generates the angular velocity DB 150f will be described. As described in FIG. 10, the angular velocities include the "Hip", "Knee", "Ankle", "Shoulder", and "Elbow" angular velocities.

An example of processing in which the specifying unit 160d calculates the "Hip" angular velocity will be described. The specifying unit 160d calculates the "Hip" angular velocity of each frame number on the basis of the expression (1). A frame time interval indicates a time interval before and after a preset frame.

$$\omega_{hn+1} = (\text{an angle } \theta_{hn+1} - \text{the angle } \theta_{hn})/\text{the frame time interval} \quad (1)$$

An example of processing in which the specifying unit 160d calculates the "Knee" angular velocity will be described. The specifying unit 160d calculates the "Knee" angular velocity of each frame number on the basis of the expression (2).

$$\omega_{kn+1} = (\text{an angle } \theta_{kn+1} - \text{the angle } \theta_{kn})/\text{the frame time interval} \quad (2)$$

An example of processing in which the specifying unit 160d calculates the "Ankle" angular velocity will be described. The specifying unit 160d calculates the "Ankle" angular velocity of each frame number on the basis of the expression (3).

$$\omega_{an+1} = (\text{an angle } \theta_{an+1} - \text{the angle } \theta_{an})/\text{the frame time interval} \quad (3)$$

An example of processing in which the specifying unit 160d calculates the "Shoulder" angular velocity will be described. The specifying unit 160d calculates the "Shoulder" angular velocity of each frame number on the basis of the expression (4).

$$\omega_{sn+1} = (\text{an angle } \theta_{sn+1} - \text{the angle } \theta_{sn})/\text{the frame time interval} \quad (4)$$

An example of processing in which the specifying unit 160d calculates the "Elbow" angular velocity will be described. The specifying unit 160d calculates the "Elbow" angular velocity of each frame number on the basis of the expression (5).

$$\omega_{en+1} = (\text{an angle } \theta_{en+1} - \text{the angle } \theta_{en})/\text{the frame time interval} \quad (5)$$

Next, the specifying unit 160d identifies the frame number (time) having maximum angular velocity for each joint after generating the angular velocity DB 150f.

The specifying unit 160d scans a line of the "Hip" angular velocity in the angular velocity DB 150f, and specifies the frame number having maximum "Hip" angular velocity $\omega_h$. The specifying unit 160d converts the frame number into time, and specifies the time when the "Hip" angular velocity $\omega_h$ becomes maximum. In the following description, the time at which the "Hip" angular velocity $\omega_h$ becomes maximum is described as "$T_{mh}$" as appropriate.

The specifying unit 160d scans a line of the "Knee" angular velocity in the angular velocity DB 150f, and specifies the frame number having maximum "Knee" angular velocity $\omega_k$. The specifying unit 160d converts the frame number into time, and specifies the time when the "Knee" angular velocity $\omega_k$ becomes maximum. In the following description, the time at which the "Knee" angular velocity $\omega_k$ becomes maximum is described as "$T_{mk}$" as appropriate.

The specifying unit 160d scans a line of the "Ankle" angular velocity in the angular velocity DB 150f, and specifies the frame number having maximum "Ankle" angular velocity $\omega_a$. The specifying unit 160d converts the frame number into time, and specifies the time when the "Ankle" angular velocity a becomes maximum. In the following description, the time at which the "Ankle" angular velocity a becomes maximum is described as "Ta" as appropriate.

The specifying unit 160d scans a line of the "Shoulder" angular velocity in the angular velocity DB 150f, and specifies the frame number having maximum "Shoulder" angular velocity a. The specifying unit 160d converts the frame number into time, and specifies the time when the "Shoulder" angular velocity a becomes maximum. In the following description, the time at which the "Shoulder" angular velocity $\omega_s$ becomes maximum is described as "$T_{ms}$" as appropriate.

The specifying unit 160d scans a line of the "Elbow" angular velocity in the angular velocity DB 150f, and specifies the frame number having maximum "Elbow" angular velocity $\omega_e$. The specifying unit 160d converts the frame number into time, and specifies the time when the "Elbow" angular velocity $\omega_e$ becomes maximum. In the following description, the time at which the "Elbow" angular velocity ca becomes maximum is described to as "$T_{me}$" as appropriate.

The specifying unit 160d performs the above processing to specify the times $T_{mh}$, $T_{mk}$, $T_{ma}$, $T_{ms}$, and $T_{me}$ for each joint, and outputs the specified information to the display control unit 160e.

The display control unit 160e is a processing unit that generates information of a display screen associated with the slide bar for designating playback timing in a motion model of the player based on the sensing data or in the video obtained by capturing the player, and displays predetermined timing of each joint in a graspable state on the display unit 140.

Figure 13:
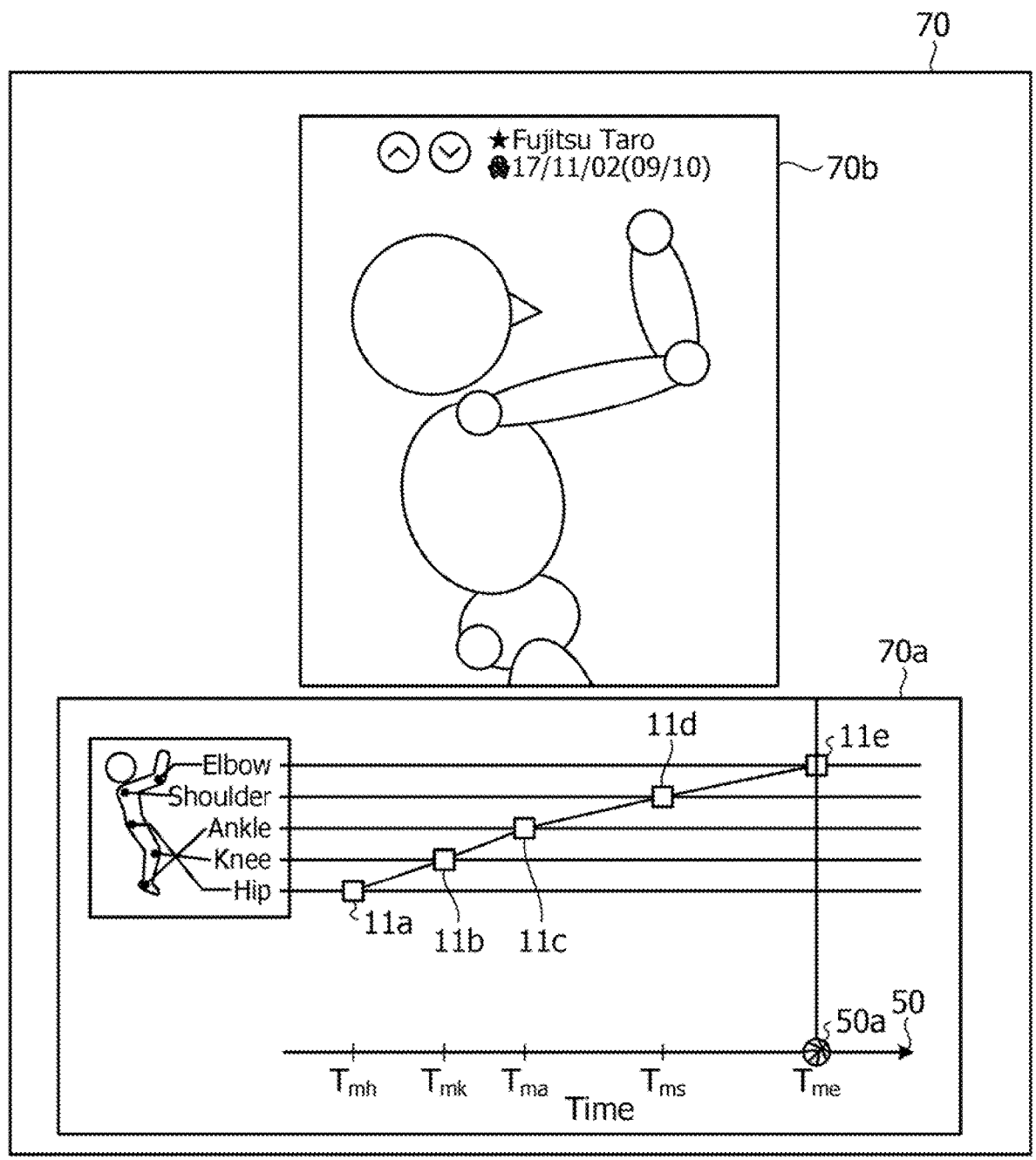
FIG. 13 is a diagram illustrating an example of a display screen generated by a display control unit according to the present embodiment.

FIG. 13 is a diagram illustrating an example of the display screen generated by the display control unit according to the present embodiment. As illustrated in FIG. 13, a display screen 70 has display areas 70a and 70b. The display area 70a is an area in which the timings at which the player 20's "Hip", "Knee", "Ankle", "Shoulder", and "Elbow" angular velocities become maximum are displayed in association with the slide bar 50.

The slide bar 50 indicates time, and the display control unit 160e specifies the time according to the position of the slide 50a on the slide bar 50. The slide 50a is movably set, and the display control unit 160e may move the slide 50a in time series or the user may operate the input unit 130 to move the slide 50a.

The display control unit 160e holds information indicating that the "Hip" angular velocity $\omega_h$ becomes maximum at the time "$T_{mh}$". The display control unit 160e displays the marker 11a at the time when the position of the slide 50a reaches the time corresponding to the time "$T_{mh}$". By displaying the set of the time "$T_{mh}$" and the marker 11a, the "Hip" angular velocity becoming maximum at the time "$T_{mh}$" becomes graspable.

The display control unit 160e holds information indicating that the "Knee" angular velocity $\omega_k$ becomes maximum at the time "$T_{mk}$". The display control unit 160e displays the marker 11b at the time when the position of the slide 50a reaches the time corresponding to the time "$T_{mk}$". By displaying the set of the time "$T_{mk}$" and the marker 11b, the "Knee" angular velocity becoming maximum at the time "$T_{mk}$" becomes graspable.

The display control unit 160e holds information Indicating that the "Ankle" angular velocity $\omega_a$ becomes maximum at the time "$T_{ma}$". The display control unit 160e displays the marker 11c at the time when the position of the slide 50a reaches the time corresponding to the time "$T_{ma}$". By displaying the set of the time "$T_{ma}$" and the marker 11c, the "Ankle" angular velocity becoming maximum at the time "$T_{ma}$" becomes graspable.

The display control unit 160e holds information indicating that the "Shoulder" angular velocity $\omega_s$ becomes maximum at the time "$T_{ms}$". The display control unit 160e displays the marker 11d at the time when the position of the slide 50a reaches the time corresponding to the time "$T_{ms}$". By displaying the set of the time "$T_{ms}$" and the marker Id, the "Shoulder" angular velocity becoming maximum at the time "$T_{ms}$" becomes graspable.

The display control unit 160e holds information indicating that the "Elbow" angular velocity $\omega_e$ becomes maximum at the time "$T_{me}$". The display control unit 160e displays the marker 11e at the time when the position of the slide 50a reaches the time corresponding to the time "$T_{me}$". By displaying the set of the time "$T_{me}$" and the marker 11e, the "Elbow" angular velocity becoming maximum at the time "$T_{me}$" becomes graspable.

As described above, the display control unit 160e displays the timings at which the player 20's "Hip", "Knee", "Ankle", "Shoulder", and "Elbow" angular velocities become maximum in accordance with movement of the slide 50a. Thereby, the user can confirm the order of the joints having maximum angular velocity and can confirm whether the motions of the joints can be well linked (whether force is well transmitted). In the example illustrated in FIG. 13, the force is transmitted in the order of "Hip", "Knee", "Ankle", "Shoulder", and "Elbow", and it can be seen that the form is ideal.

The display area 70b is an area for displaying the 3D model of the player 20. For example, the display control unit 160e specifies a time corresponding to the position of the slide 50a, acquires the 3D model data corresponding to the specified time from the 3D model DB 150e, and displays the 3D model data in the display area 70b. Thereby, the motion of the body of the player 20 in accordance with the movement of the slide 50a can also be confirmed on the 3D model.

By adopting such a GUI in FIG. 13, the information processing apparatus according to the present embodiment can receive, from the user, an operation to adjust the slide 50a with the marker 11e indicating the timing at which the elbow joint has most substantially moved, for example. Moreover, the information processing apparatus can display the 3D model corresponding to the timing at which the elbow joint has most substantially moved in the display area 70b. Therefore, the user can confirm the posture of the player at that timing or the transition (motion) of the posture from the timing at which the elbow joint has most substantially moved.

Furthermore, the information processing apparatus according to the present embodiment can receive an operation to adjust the slide 50a with a point slightly before the marker 11e that is the timing at which the elbow joint has most substantially moved from the user, for example. Moreover, the information processing apparatus can display the 3D model corresponding to timing slightly before the timing at which the elbow joint has most substantially moved in the display area 70b. Therefore, the user can confirm the posture of the player at timing slightly before the timing at which the elbow joint has most substantially moved, or the transition (motion) of the posture from the timing slightly before the timing at which the elbow joint has most substantially moved.

Incidentally, the display screen illustrated in FIG. 13 is an example, and the display control unit 160e may generate another display screen and display the generated display screen on the display unit 140. In the following description, other display screen examples (1) to (3) generated by the display control unit 160e will be described.

Another display screen example (1) generated by the display control unit 160e will be described. The display control unit 160e may display, regarding a plurality of players, the timings at which the players' "Hip", "Knee", "Ankle", "Shoulder", and "Elbow" angular velocities become maximum in association with the slide bar 50.

Figure 14:
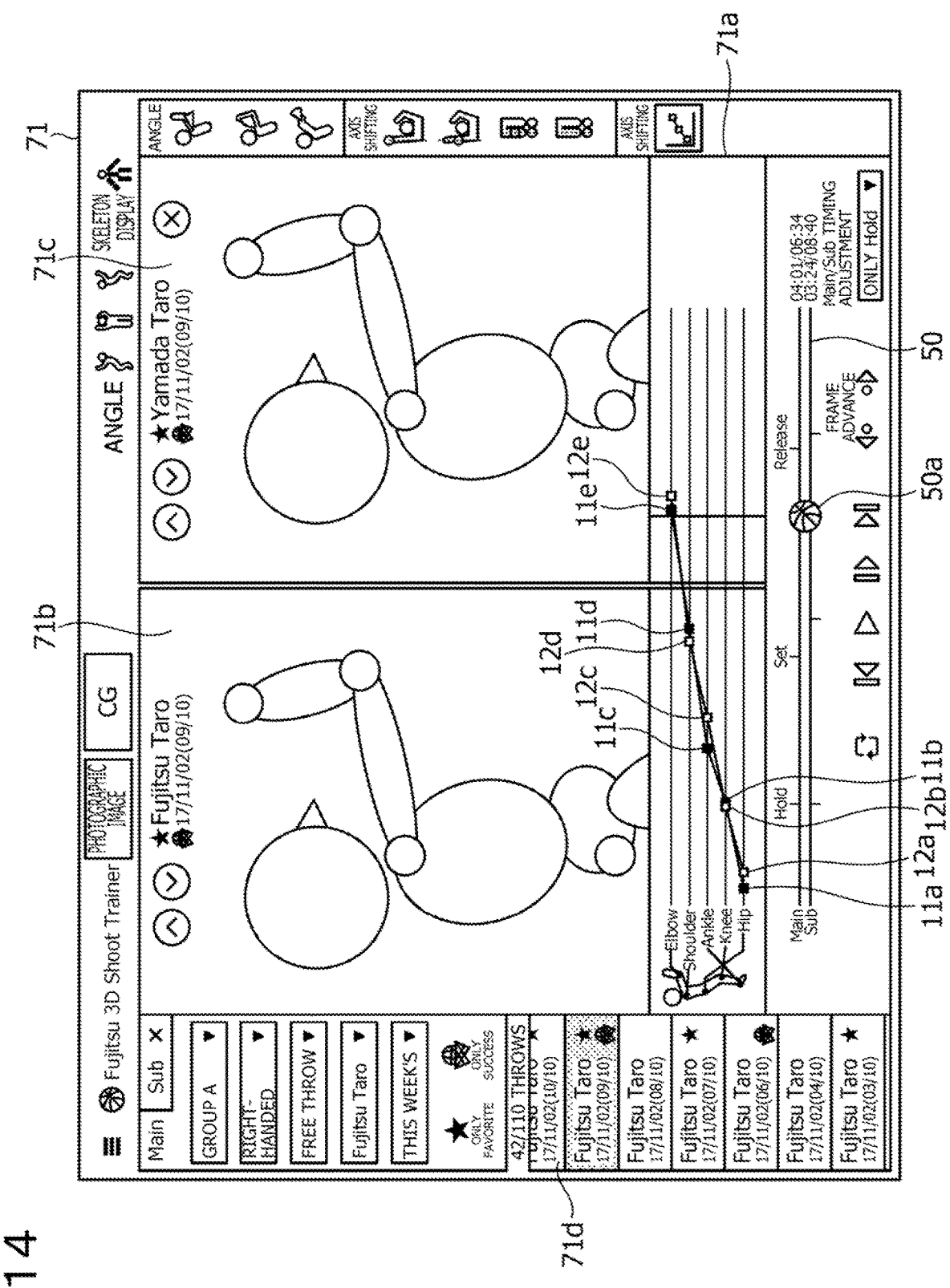
FIG. 14 is a diagram illustrating another display screen example (1)

FIG. 14 is a diagram illustrating another display screen example (1). As illustrated in FIG. 14, a display screen 71 has display areas 71a, 71b, 71c, and 71d. The display area 71a is an area in which the timings at which a plurality of players' "Hip", "Knee", "Ankle", "Shoulder", and "Elbow" angular velocities become maximum are displayed in association with the slide bar 50.

Here, a case of displaying information regarding a first player and a second player will be described. For example, the user operates the input unit 130 to designate and input the player IDs corresponding to the first player and the second player to the information processing apparatus 100. Although description is omitted, the specifying unit 160d specifies the time at which the angular velocities of the joints of the first player become maximum and the time at which the angular velocities of the joints of the second player become maximum, and notifies the times to the display control unit 160e.

Similar to FIG. 13, the slide 50a is movably set on the slide bar 50. The display control unit 160e may move the slide 50a in time series or the user may operate the input unit 130 to move the slide 50a. The user may operate the input unit 130 (drag operation) to move the slide 50a or may perform instructions with respect to the movement of the slide 50a, such as time-series movement, skip movement, frame advance, or pause to control the movement of the slide 50a.

For example, it is assumed that the display control unit 160e holds information indicating that the "Hip" angular velocity of the first player becomes maximum at time "$T_{mh1}$" (not illustrated). The display control unit 160e displays the marker 11a at the time when the position of the slide 50a reaches the time corresponding to the time "$T_{mh1}$". By displaying the set of the time "$T_{mh1}$" and the marker 11a, the "Hip" angular velocity of the first player becoming maximum at the time "$T_{mh1}$" becomes graspable.

It is assumed that the display control unit 160e holds information indicating that the "Hip" angular velocity of the second player becomes maximum at time "$T_{mh2}$" (not illustrated). The display control unit 160e displays a marker 12a at the time when the position of the slide 50a reaches the time corresponding to the time "$T_{mh2}$". By displaying the set of the time "$T_{mh2}$" and the marker 12a, the "Hip" angular velocity of the second player becoming maximum at the time "$T_{mh2}$" becomes graspable.

It is assumed that the display control unit 160e holds information indicating that the "Knee" angular velocity of the first player becomes maximum at time "$T_{mk1}$" (not illustrated). The display control unit 160e displays the marker 11b at the time when the position of the slide 50a reaches the time corresponding to the time "$T_{mk1}$". By displaying the set of the time "$T_{mk1}$" and the marker 11b, the "Knee" angular velocity of the first player becoming maximum at the time "$T_{mk1}$" becomes graspable.

It is assumed that the display control unit 160e holds information indicating that the "Knee" angular velocity of the second player becomes maximum at time "$T_{mk2}$" (not illustrated). The display control unit 160e displays the marker 12b at the time when the position of the slide 50a reaches the time corresponding to the time "$T_{mk2}$". By displaying the set of the time "$T_{mk2}$" and the marker 12b, the "Knee" angular velocity of the second player becoming maximum at the time "$T_{mk2}$" becomes graspable.

It is assumed that the display control unit 160e holds information indicating that the "Ankle" angular velocity of the first player becomes maximum at time "$T_{ma1}$" (not illustrated). The display control unit 160e displays the marker 11c at the time when the position of the slide 50a reaches the time corresponding to the time "$T_{ma1}$". By displaying the set of the time "$T_{ma1}$" and the marker 11c, the "Ankle" angular velocity of the first player becoming maximum at the time "$T_{ma1}$" becomes graspable.

It is assumed that the display control unit 160e holds information indicating that the "Ankle" angular velocity of the second player becomes maximum at time "$T_{ma2}$" (not illustrated). The display control unit 160e displays the marker 12c at the time when the position of the slide 50a reaches the time corresponding to the time "$T_{ma2}$". By displaying the set of the time "$T_{ma2}$" and the marker 12c, the "Ankle" angular velocity of the second player becoming maximum at the time "$T_{ma2}$" becomes graspable.

The display control unit 160e holds information indicating that the "Shoulder" angular velocity of the first player becomes maximum at time "$T_{ms1}$" (not illustrated). The display control unit 160e displays the marker 11d at the time when the position of the slide 50a reaches the time corresponding to the time "$T_{ms1}$". By displaying the set of the time "$T_{ms1}$" and the marker 11d, the "Shoulder" angular velocity of the first player becoming maximum at the time "$T_{ms1}$" becomes graspable.

The display control unit 160e holds information indicating that the "Shoulder" angular velocity of the second player becomes maximum at time "$T_{ms2}$" (not illustrated). The display control unit 160e displays the marker 12d at the time when the position of the slide 50a reaches the time corresponding to the time "$T_{ms2}$". By displaying the set of the time "$T_{ms2}$" and the marker 12d, the "Shoulder" angular velocity of the second player becoming maximum at the time "$T_{ms2}$" becomes graspable.

The display control unit 160e holds information indicating that the "Elbow" angular velocity of the first player becomes maximum at time "$T_{ms1}$" (not illustrated). The display control unit 160e displays the marker 11e at the time when the position of the slide 50a reaches the time corresponding to the time "$T_{me1}$". By displaying the set of the time "$T_{me1}$" and the marker 11e, the "Elbow" angular velocity of the first player becoming maximum at the time "$T_{me1}$" becomes graspable.

The display control unit 160e holds information indicating that the "Elbow" angular velocity of the second player becomes maximum at time "$T_{me2}$" (not illustrated). The display control unit 160e displays the marker 12e at the time when the position of the slide 50a reaches the time corresponding to the time "$T_{me2}$". By displaying the set of the time "$T_{me2}$" and the marker 12e, the "Elbow" angular velocity of the second player becoming maximum at the time "$T_{me2}$" becomes graspable.

As described above, the display control unit 160e displays the timings at which the each player's "Hip", "Knee", "Ankle", "Shoulder", and "Elbow" angular velocities become maximum in accordance with the movement of the slide 50a. As a result, the order of the joints having maximum angular velocity can be compared and confirmed for each player.

The display area 71b is an area for displaying the 3D model of the first player. For example, the display control unit 160e specifies a time corresponding to the position of the slide 50a, acquires the 3D model data of the first player corresponding to the specified time from the 3D model DB 150e, and displays the 3D model data in the display area 71b. Thereby, the motion of the body of the first player in accordance with the movement of the slide 50a can also be confirmed on the 3D model.

The display area 71c is an area for displaying the 3D model of the second player. For example, the display control unit 160e specifies a time corresponding to the position of the slide 50a, acquires the 3D model data of the second player corresponding to the specified time from the 3D model DB 150e, and displays the 3D model data in the display area 71c. Thereby, the motion of the body of the second player in accordance with the movement of the slide 50a can also be confirmed on the 3D model.

The display area 71d is an area for displaying candidates of the players to be selected as the first player and the second player. The user operates the input unit 130 to select the first player and the second player from a plurality of players displayed in the display area 71d.

Although not described in FIG. 14, in a case of receiving designation of a predetermined joint angle, the display control unit 160e may display a time-series change in the designated joint angle in the display areas 71b and 71c. Furthermore, in the display areas 71b and 71c illustrated in FIG. 14, 3D models of the players viewed from a side are illustrated. However, an embodiment is not limited to thereto. The user can also operate the input unit 130 to change a viewpoint and can confirm the forms of the players from another viewpoint. The display control unit 160e may further display a projection angle when the player throws a ball.

Figure 15:
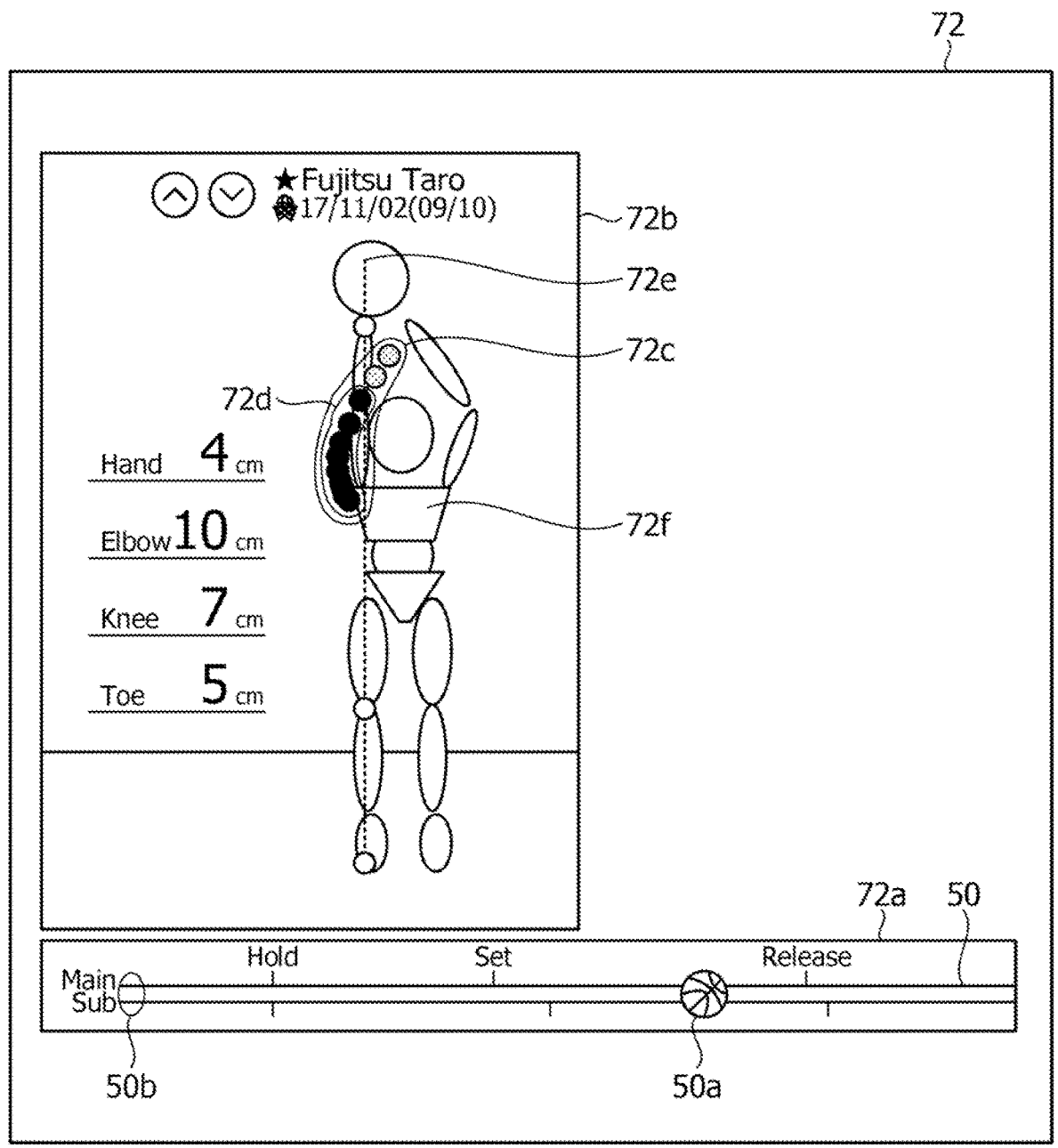
FIG. 15 is a diagram illustrating another display screen example (2)

Next, another display screen example (2) generated by the display control unit 160e will be described. FIG. 15 is a diagram illustrating another display screen example (2). As illustrated in FIG. 15, a display screen 72 has display areas 72a and 72b.

The display area 72a is an area for displaying the slide bar 50. The slide 50a is movably set on the slide bar 50. The slide bar 50 indicates time, and the display control unit 160e specifies the time according to the position of the slide 50a on the slide bar 50. The slide 50a is movably set, and the display control unit 160e may move the slide 50a in time series or the user may operate the input unit 130 to move the slide 50a.

The display area 72b is an area for displaying a movement locus of a predetermined joint of the player (for example, the player 20) in a 3D model. In the example illustrated in FIG. 15, a movement locus of a right wrist (WRIST_RIGHT) of the player 20 is illustrated. The display control unit 160e may display the 3D model of the whole body of the player 20 in accordance with the display area 72b.

The display control unit 160e refers to the joint position DB 150d and acquires information in which three-dimensional coordinates of joint positions of the right wrist are associated with time. The display control unit 160e displays each joint position of the right wrist corresponding to each time in an area 72c. For example, the display control unit 160e displays each joint position in the area 72c using a sphere.

In a case where the position of the slide 50a is located at a start position 50b, the display control unit 160e displays a sphere corresponding to each joint position in a semitransparent manner. In a case where the position of the slide 50a is moved, the display control unit 160e performs processing of specifying a time corresponding to the position of the moved slide 50a, and changing the sphere of each joint position associated with a time before the specified time from "semitransparent" to "black".

For example, it is assumed that the slide 50a is moved, and the time corresponding to the moved slide 50a is time TA. Furthermore, it is assumed that spheres of each joint position associated with times before the time TA are spheres 72d illustrated in FIG. 15. In this case, the display control unit 160e performs the processing of changing the spheres 72d from "semitransparent" to "black".

The display control unit 160e may further display the reference line 72e indicating the ideal position of the right wrist in the display area 72b, and calculate and display a difference between the reference line 72e and the position of the right wrist corresponding to the time specified by the slide 50a.

The display screen 72 illustrated in FIG. 15 is a display screen of a case where the player 20 is viewed from the front. The user can also operate the input unit 130 to change a viewpoint and can confirm the form of the player from another viewpoint.

Another display screen example (3) generated by the display control unit 160e will be described. The display control unit 160e may attach and display a video of a video frame stored in the video DB 150b to the 3D model of the player illustrated in the display area 70b in FIG. 13, the display areas 71b and 71c in FIG. 14, and the display area 72b in FIG. 15.

Figure 16:
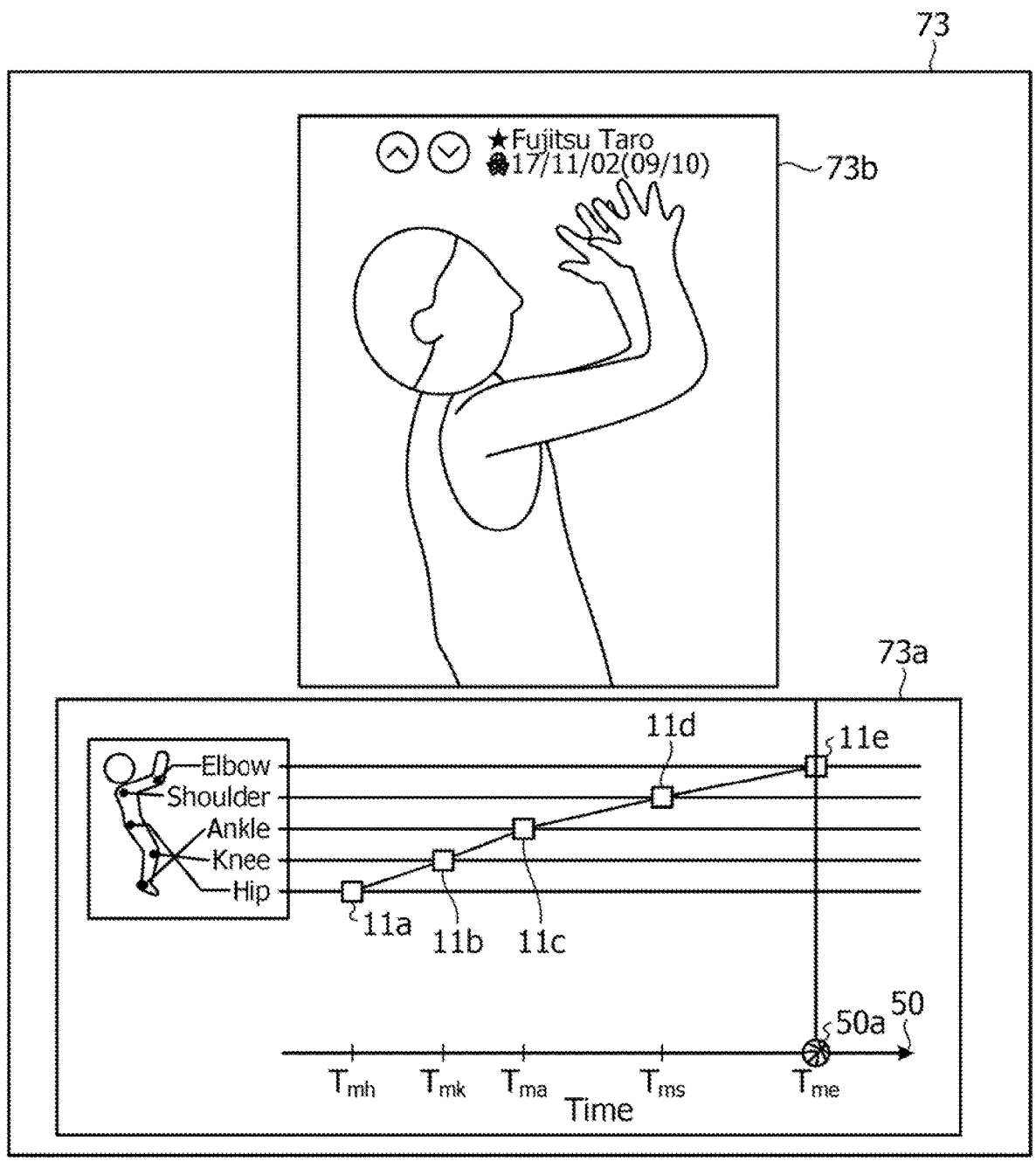
FIG. 16 is a diagram illustrating another display screen example (3)

FIG. 16 is a diagram illustrating another display screen example (3). As illustrated in FIG. 16, a display screen 73 has display areas 73a and 73b. The display area 73a is an area in which the timings at which the player 20's "Hip", "Knee", "Ankle", "Shoulder", and "Elbow" angular velocities become maximum are displayed in association with the slide bar 50. Other description of the display area 73a is similar to the description of the display area 70a described in FIG. 13.

The display area 73b is an area for displaying a 3D model of the player 20 with the video of the player 20 attached. For example, the display control unit 160e specifies a time corresponding to the position of the slide 50a, acquires the 3D model data corresponding to the specified time from the 3D model DB 150e, and displays the 3D model data in the display area 70b. Furthermore, in the case of displaying the 3D model data, the display control unit 160e acquires image data of each portion of the player 20 from the video DB 150b, and attaches the acquired image data to the 3D model data and displays the attached data. Thereby, the motion of the body of the player 20 in accordance with the movement of the slide 50a can be confirmed on a more realistic 3D model.

Note that the display control unit 160e may display the video frame stored in the video DB 150b in another display area of the display screen 73. For example, the display control unit 160e specifies a time corresponding to the position of the slide 50a, acquires the video frame corresponding to the specified time from the video DO 150b, and displays the video frame in the display area.

Figure 17:
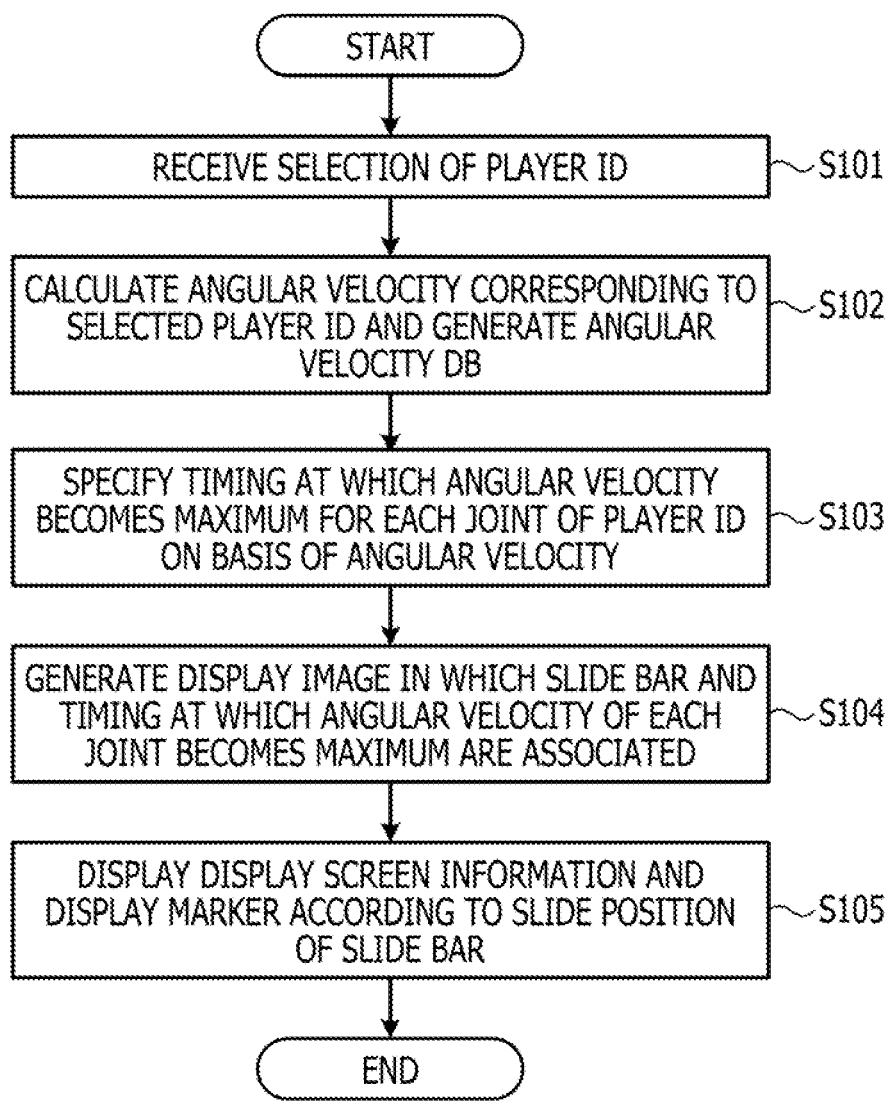
FIG. 17 is a flowchart illustrating a processing procedure of the information processing apparatus according to the present embodiment.

Next, an example of a processing procedure of the information processing apparatus 100 according to the present embodiment will be described. FIG. 17 is a flowchart illustrating a processing procedure of the information processing apparatus according to the present embodiment. As illustrated in FIG. 17, the reception unit 160c of the information processing apparatus 100 receives selection of the player ID (step S101).

The specifying unit 160d of the information processing apparatus 100 calculates the angular velocity corresponding to the selected player ID and generates the angular velocity DB 150f (step S102). The specifying unit 160d specifies the timing at which the angular velocity becomes maximum for each joint of the player ID on the basis of the angular velocity (step S103).

The display control unit 160e of the information processing apparatus 100 generates the display screen in which the slide bar is associated with the timing at which the angular velocity of each joint becomes maximum (step S104). The display control unit 160e displays the display screen and displays the marker according to the slide position of the slide bar (step S105).

Next, effects of the information processing apparatus 100 according to the present embodiment will be described. The information processing apparatus 100 senses the player who performs a series of actions, using the 3D laser sensor 60a, acquires the sensing data, and specifies the motion of each joint of the player, using the sensing data. The information processing apparatus 100 calculates an angular velocity of each joint from a motion of the each joint, specifies timing when the angular velocity becomes maximum for the each joint, and displays the timing in association with a slide bar for designating timing. By referring to the displayed information, the user can confirm the order of the joints having maximum angular velocity and can confirm whether the motions of the joints can be well linked (whether force is well transmitted). Therefore, the information processing apparatus 100 according to the present embodiment can assist grasping the motion and the state of the body of the player who performs training, thereby improving the problems described in Reference Technology 1 in FIG. 1A and the like.

According to the information processing apparatus 100, not only the timing at which each angular velocity becomes maximum but also the posture of the player based on the 3D model of the player is displayed in association with the slide bar, as described in FIG. 13 and the like. Therefore, not only whether the motions of the joints are well linked but also the form of the player corresponding to a characteristic point can be confirmed from the motions of the joints.

The information processing apparatus 100 displays, in association with the slide bar, point timing of a series of motions of the joints of the first player and point timing of a series of motions of the joints of the second player. For this reason, whether the motions of the joints are well linked can be compared between different players.

In the information processing apparatus 100 according to the present embodiment, the player 20 performs a series of actions related to basketball, and the information processing apparatus 100 specifies the timing at which the angular velocity becomes maximum for each joint and displays the timing in association with the slide bar. However, an embodiment is not limited thereto. For example, the player 20 may perform a series of actions related to another sport, and the information processing apparatus 100 may identify the timing at which the angular velocity becomes maximum for each joint and display the timing in association with the slide bar.

Other sports include trampoline, swim diving, figure skating, karate style, ballroom dance, snowboarding, skateboarding, ski aerial, and surfing. Furthermore, the present embodiment may be applied to, for example, form check of classical ballet, ski jump, mogul air, turn, baseball, and basketball. Furthermore, the present embodiment may be applied to sports such as kendo, judo, wrestling, and sumo.

Furthermore, the information processing apparatus 100 according to the present embodiment calculates an angular velocity of each joint from a motion of the each joint, specifies timing at which the angular velocity becomes maximum for the each joint, and displays the timing in association with a slide bar for designating timing. However, an embodiment is not limited thereto. For example, the information processing apparatus 100 may calculate an angular acceleration instead of angular velocity, specify timing at which the angular acceleration becomes maximum, and display the timing in association with a slide bar for designating timing. Furthermore, the information processing apparatus 100 may specify timing at which an angle becomes maximum and display the timing in association with a slide bar for designating timing.

Figure 18:
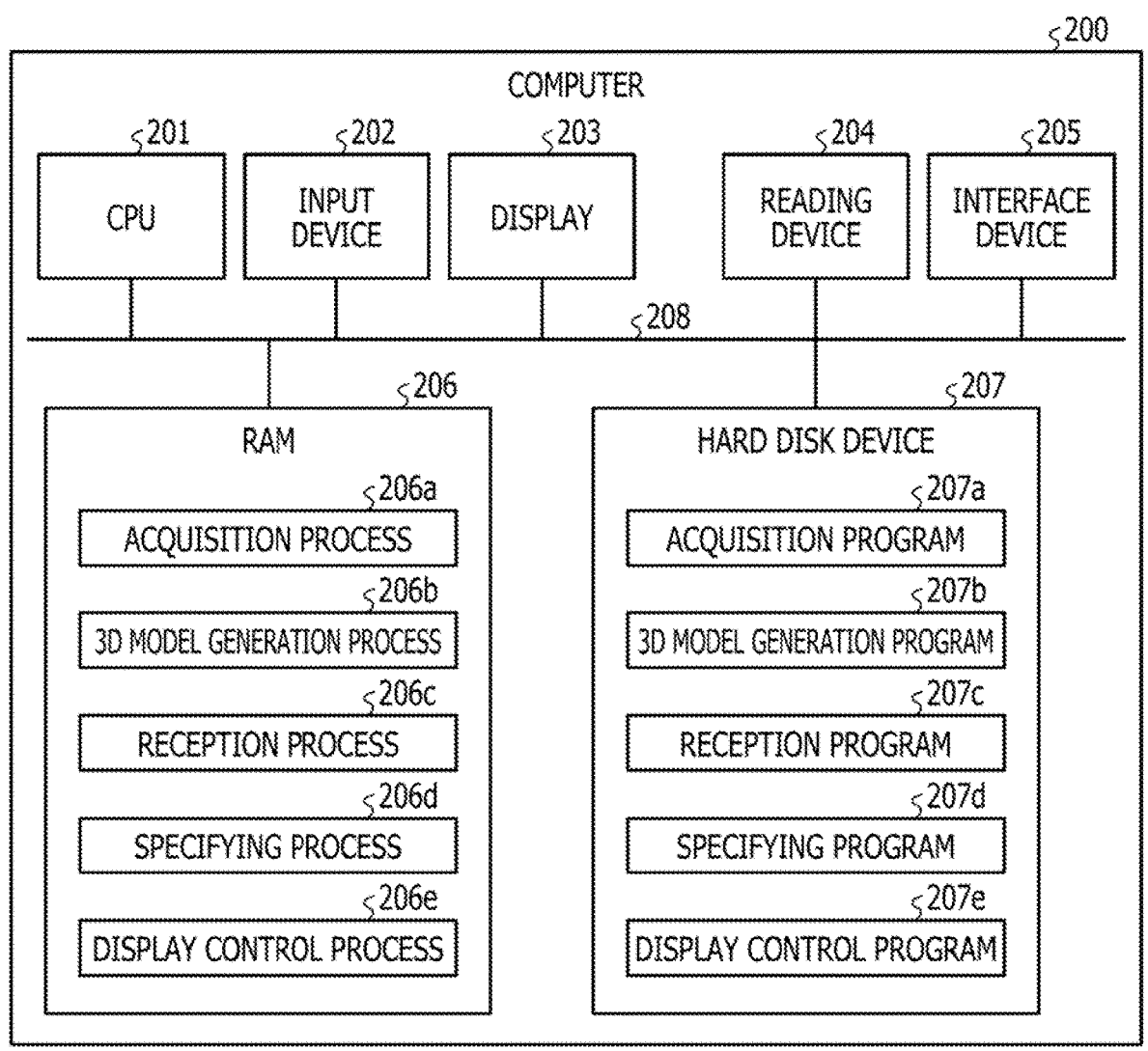
FIG. 18 is a diagram illustrating an example of a hardware configuration of a computer that implements functions similar to those of the information processing apparatus.

Next, an exemplary hardware configuration of a computer that implements functions similar to those of the information processing apparatus 100 described in the embodiment above will be described. FIG. 18 is a diagram illustrating an example of a hardware configuration of a computer that implements functions similar to those of the information processing apparatus.

As illustrated in FIG. 18, a computer 200 includes a CPU 201 that executes various types of arithmetic processing, an input device 202 that receives data input from a user, and a display 203. Furthermore, the computer 200 includes a reading device 204 that reads a program and the like from a storage medium, and an interface device 205 that exchanges data with the 3D laser sensor, the camera, and the like via a wired or wireless network. The computer 200 includes a RAM 206 that temporarily stores various types of information, and a hard disk device 207. Then, the devices 201 to 207 are connected to a bus 208.

The hard disk device 207 includes an acquisition program 207a, a 3D model generation program 207b, a reception program 207c, a specifying program 207d, and a display control program 207e. The CPU 201 reads the acquisition program 207a, the 3D model generation program 207b, the reception program 207c, the specifying program 207d, and the display control program 207e and loads the read programs on the RAM 206.

The acquisition program 207a functions as an acquisition process 206a. The 3D model generation program 207b functions as a 3D model generation process 206b. The reception program 207c functions as a reception process 206c. The specifying program 207d functions as a specifying process 206d. The display control program 207e functions as a display control process 206e.

Processing of the acquisition process 206a corresponds to the processing of the acquisition unit 160a. Processing of the 3D model generation process 206b corresponds to the processing of the 3D model generation unit 160b. Processing of the reception process 206c corresponds to the processing of the reception unit 160c. The processing of the specifying process 206d corresponds to the processing of the specifying unit 160d. Processing of the display control process 206e corresponds to the processing of the display control unit 160e.

Note that the programs 207a to 207e may not need to be stored in the hard disk device 207 beforehand. For example, each of the programs may be stored in a "portable physical medium" such as a flexible disk (FD), a compact disc read only memory (CD-ROM), a digital versatile disc (DVD) disk, a magneto-optical disk, or an IC card to be inserted in the computer 200. Then, the computer 200 may read the programs 207a to 207c and execute the programs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A display method comprising:
    acquiring, by a computer, sensing data obtained by sensing a motion of a player by a three-dimension (3D) sensor;
    specifying predetermined timing of each joint from a change in a degree of bending of each joint of the player based on the sensing data; and
    displaying the predetermined timing of each joint in a graspable state in association with a slide bar for designating playback timing in a motion model of the player based on the sensing data or a video obtained by capturing the player.

2. The display method according to claim 1, further comprising:
    calculates respective angular velocities of a plurality of joints of the player as the change in a degree of bending of each joint,
    specifies timing at which the angular velocity becomes maximum for the each joint as the predetermined timing of the each joint, and
    displays the timing at which the angular velocity becomes maximum in a graspable state in association with the slide bar.

3. The display method according to claim 1, further comprising:
    displaying the motion model or video data of the player from the timing designated with the slide bar.

4. The display method according to claim 1, wherein the displaying includes displaying predetermined timing at each joint of a first player and predetermined timing at each joint of a second player in association with the slide bar.

5. A non-transitory computer-readable recording medium having stored therein a display program for causing a computer to execute processing comprising:
    acquiring sensing data obtained by sensing a motion of a player by a 3D sensor;
    specifying predetermined timing of each joint from a change in a degree of bending of each joint of the player based on the sensing data; and
    displaying the predetermined timing of each joint in a graspable state in association with a slide bar for designating playback timing in a motion model of the player based on the sensing data or a video obtained by capturing the player.

6. The non-transitory computer-readable recording medium having stored therein a display program according to claim 5, for causing the computer to execute processing of:
    calculating respective angular velocities of a plurality of joints of the player as the change in a degree of bending of each joint;
    specifying timing at which the angular velocity becomes maximum for the each joint as the predetermined timing of the each joint; and
    displaying the timing at which the angular velocity becomes maximum in a graspable state in association with the slide bar.

7. The non-transitory computer-readable recording medium having stored therein a display program according to claim 5, for causing the computer to execute processing of:
    displaying the motion model or video data of the player from the timing designated with the slide bar.

8. The non-transitory computer-readable recording medium having stored therein a display program according to claim 5, wherein the displaying includes displaying predetermined timing at each joint of a first player and predetermined timing at each joint of a second player in association with the slide bar.

9. An information processing apparatus comprising:
    a memory; and
    a processor coupled to the memory and configured to:
    acquire sensing data obtained by sensing a motion of a player by a 3D sensor;
    specify predetermined timing of each joint from a change in a degree of bending of each joint of the player based on the sensing data; and
    display the predetermined timing of each joint in a graspable state in association with a slide bar for designating playback timing in a motion model of the player based on the sensing data or a video obtained by capturing the player.

10. The information processing apparatus according to claim 9, wherein the processor calculates respective angular velocities of a plurality of joints of the player as the change in a degree of bending of the each joint, and specifies timing at which the angular velocity becomes maximum for the each joint as the predetermined timing of the each joint, and displays the timing at which the angular velocity becomes maximum in a graspable state in association with the slide bar.

11. The information processing apparatus according to claim 9, wherein the processor displays the motion model or video data of the player from the timing designated with the slide bar.

12. The information processing apparatus according to claim 9, wherein the processor displays predetermined timing at each joint of a first player and predetermined timing at each joint of a second player in association with the slide bar.

* * * * *